(12) United States Patent
Lim et al.

(10) Patent No.: US 7,364,633 B2
(45) Date of Patent: Apr. 29, 2008

(54) DEVICE AND METHOD FOR FABRICATING LIQUID CRYSTAL DISPLAY DEVICE

(75) Inventors: Young Kug Lim, Kyongsangbuk-do (KR); Soo Min Kwak, Kyongsangbuk-do (KR); Heung Sun Kim, Yongin-shi (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/661,515

(22) Filed: Sep. 15, 2003

(65) Prior Publication Data

US 2004/0095548 A1 May 20, 2004

(30) Foreign Application Priority Data

Nov. 15, 2002 (KR) ................ 10-2002-0071227

(51) Int. Cl.
 *B32B 41/00* (2006.01)
(52) U.S. Cl. .............. 156/64; 156/275.5; 156/295; 156/299
(58) Field of Classification Search ............ 156/378, 156/351, 379, 358, 381, 382, 585, 550, 64, 156/273.7, 275.5, 275.7, 295, 299; 29/833, 29/834
See application file for complete search history.

(56) References Cited

U.S. PATENT DOCUMENTS

| | | |
|---|---|---|
| 3,978,580 A | 9/1976 | Leupp et al. |
| 4,094,058 A | 6/1978 | Yasutake et al. |
| 4,653,864 A | 3/1987 | Baron et al. |
| 4,691,995 A | 9/1987 | Yamazaki et al. |
| 4,775,225 A | 10/1988 | Tsuboyama et al. |
| 5,247,377 A | 9/1993 | Omeis et al. |
| 5,263,888 A | 11/1993 | Ishihara et al. |
| 5,379,139 A | 1/1995 | Sato et al. |

(Continued)

FOREIGN PATENT DOCUMENTS

DE   3902255 A1   8/1990

(Continued)

OTHER PUBLICATIONS

Translation of JP2001-356353 (IDS reference BB2 from Dec. 16, 2003 IDS).*

*Primary Examiner*—George Koch
(74) *Attorney, Agent, or Firm*—McKenna Long & Aldridge LLP

(57) ABSTRACT

A device for fabricating LCD devices includes a base frame, a lower chamber unit on the base frame, an upper chamber unit over the lower chamber unit and moveable over the base frame, chamber moving means for raising/lowering the upper chamber unit, stages within interior spaces of the upper and lower chamber units, wherein substrates are securable to each of the stages, and sealing means on at least one surface of the chamber units for sealing an interior space definable by joined upper and lower chamber units, the substrates being within the sealed interior space. A method for fabricating LCD devices includes loading substrates onto stages, lowering an upper chamber unit to seal an interior space from an external environment, evacuating the sealed interior space, aligning the first and second substrates, contacting the first and second substrates with sealant material, venting the sealed interior space, and unloading the bonded substrates.

16 Claims, 23 Drawing Sheets

U.S. PATENT DOCUMENTS

| | | |
|---|---|---|
| 5,406,989 A | 4/1995 | Abe |
| 5,499,128 A | 3/1996 | Hasegawa et al. |
| 5,507,323 A | 4/1996 | Abe |
| 5,511,591 A | 4/1996 | Abe |
| 5,539,545 A | 7/1996 | Shimizu et al. |
| 5,548,429 A | 8/1996 | Tsujita |
| 5,642,214 A | 6/1997 | Ishii et al. |
| 5,680,189 A | 10/1997 | Shimizu et al. |
| 5,742,370 A | 4/1998 | Kim et al. |
| 5,757,451 A | 5/1998 | Miyazaki et al. |
| 5,852,484 A | 12/1998 | Inoue et al. |
| 5,854,664 A | 12/1998 | Inoue et al. |
| 5,861,932 A | 1/1999 | Inata et al. |
| 5,875,922 A | 3/1999 | Chastine et al. |
| 5,952,676 A | 9/1999 | Sato |
| 5,952,678 A | 9/1999 | Ashida |
| 5,956,112 A | 9/1999 | Fujimori et al. |
| 6,001,203 A | 12/1999 | Yamada et al. |
| 6,011,609 A | 1/2000 | Kato et al. |
| 6,016,178 A | 1/2000 | Kataoka et al. |
| 6,016,181 A | 1/2000 | Shimada |
| 6,023,313 A | 2/2000 | Hazama |
| 6,055,035 A | 4/2000 | von Gutfeld et al. |
| 6,129,804 A * | 10/2000 | Gaynes et al. ............ 156/297 |
| 6,163,357 A | 12/2000 | Nakamura |
| 6,190,488 B1 | 2/2001 | Tada et al. |
| 6,219,126 B1 | 4/2001 | von Gutfeld |
| 6,226,067 B1 | 5/2001 | Nishiguchi et al. |
| 6,236,445 B1 | 5/2001 | Foschaar et al. |
| 6,304,306 B1 | 10/2001 | Shiomi et al. |
| 6,304,311 B1 | 10/2001 | Egami et al. |
| 6,337,730 B1 | 1/2002 | Ozaki et al. |
| 6,414,733 B1 | 7/2002 | Ishikawa et al. |
| 2001/0004281 A1 | 6/2001 | Sasaki |
| 2001/0021000 A1 | 9/2001 | Egami |
| 2002/0008838 A1 | 1/2002 | Matsuda |
| 2002/0043344 A1 | 4/2002 | Watanabe et al. |
| 2002/0062787 A1 | 5/2002 | Hashizume et al. |

FOREIGN PATENT DOCUMENTS

| | | |
|---|---|---|
| EP | 1 003 066 A1 A1 | 5/2000 |
| JP | 51-065656 | 6/1976 |
| JP | 57-038414 A1 | 3/1982 |
| JP | 57-088428 A1 | 6/1982 |
| JP | 58-027126 A1 | 2/1983 |
| JP | 59-057221 | 4/1984 |
| JP | 59-195222 | 11/1984 |
| JP | 60-111221 | 6/1985 |
| JP | 60-164723 A1 | 8/1985 |
| JP | 60-217343 A1 | 10/1985 |
| JP | 61-007822 A1 | 1/1986 |
| JP | 61-055625 A1 | 3/1986 |
| JP | S62-054225 | 3/1987 |
| JP | S62-054228 | 3/1987 |
| JP | S62-054229 | 3/1987 |
| JP | 62-089025 A1 | 4/1987 |
| JP | 62-090622 A1 | 4/1987 |
| JP | 62-205319 A1 | 9/1987 |
| JP | 63-109413 A1 | 5/1988 |
| JP | 63-110425 A1 | 5/1988 |
| JP | 63-128315 A1 | 5/1988 |
| JP | 63-311233 A1 | 12/1988 |
| JP | H03-009549 | 1/1991 |
| JP | 421821 | 1/1992 |
| JP | H0-5036426 | 2/1993 |
| JP | H05-036425 | 2/1993 |
| JP | 5107533 | 4/1993 |
| JP | H05-107533 | 4/1993 |
| JP | 05-127179 A1 | 5/1993 |
| JP | 05-154923 | 6/1993 |
| JP | 05-265011 A1 | 10/1993 |
| JP | 05-281557 A1 | 10/1993 |
| JP | 05-281562 A1 | 10/1993 |
| JP | H06-018829 | 1/1994 |
| JP | 06-051256 A1 | 2/1994 |
| JP | H06-064229 | 3/1994 |
| JP | 06-148657 A1 | 5/1994 |
| JP | 06-160871 | 6/1994 |
| JP | H06-194637 | 7/1994 |
| JP | 06-235925 | 8/1994 |
| JP | 06214204 A | 8/1994 |
| JP | 06-265915 A1 | 9/1994 |
| JP | 06-313870 | 11/1994 |
| JP | 07-084268 | 3/1995 |
| JP | 07-128674 A1 | 5/1995 |
| JP | 07-181507 A1 | 7/1995 |
| JP | H07-275770 | 10/1995 |
| JP | H07-275771 | 10/1995 |
| JP | H08-076133 | 3/1996 |
| JP | 08-095066 A1 | 4/1996 |
| JP | 08-101395 | 4/1996 |
| JP | 08-106101 A1 | 4/1996 |
| JP | 08087020 A | 4/1996 |
| JP | H08-110504 | 4/1996 |
| JP | H08-136937 | 5/1996 |
| JP | 08-171094 A1 | 7/1996 |
| JP | 08-190099 A1 | 7/1996 |
| JP | H08-173874 | 7/1996 |
| JP | 08-240807 A1 | 9/1996 |
| JP | 09-005762 A1 | 1/1997 |
| JP | 09-026578 A1 | 1/1997 |
| JP | H09-001026 | 1/1997 |
| JP | 09-061829 | 3/1997 |
| JP | 09-073075 A1 | 3/1997 |
| JP | 09-073096 A1 | 3/1997 |
| JP | H09-094500 | 4/1997 |
| JP | 09-127528 A1 | 5/1997 |
| JP | 09-223-727 | 8/1997 |
| JP | 09-230357 A1 | 9/1997 |
| JP | 09-281511 A1 | 10/1997 |
| JP | 09-311340 A1 | 12/1997 |
| JP | 10-123537 A1 | 5/1998 |
| JP | 10-123538 A1 | 5/1998 |
| JP | 10-142616 A1 | 5/1998 |
| JP | 10133188 | 5/1998 |
| JP | 10-177178 | 6/1998 |
| JP | H10-174924 | 6/1998 |
| JP | 10-0156422 B1 | 7/1998 |
| JP | 10-221700 A1 | 8/1998 |
| JP | 10-282512 A1 | 10/1998 |
| JP | 10-333157 | 12/1998 |
| JP | 10-333159 | 12/1998 |
| JP | 11-014953 A1 | 1/1999 |
| JP | 11-038424 A1 | 2/1999 |
| JP | 11-064811 A1 | 3/1999 |
| JP | 11-109388 A1 | 4/1999 |
| JP | 11-133438 | 5/1999 |
| JP | 11-142864 | 5/1999 |
| JP | 11-174477 A1 | 7/1999 |
| JP | 11-212045 A1 | 8/1999 |
| JP | 11-248930 | 9/1999 |
| JP | H11-262712 | 9/1999 |
| JP | H11-264991 | 9/1999 |
| JP | 11271782 | 10/1999 |
| JP | 11-326922 | 11/1999 |
| JP | 11-344714 A1 | 12/1999 |
| JP | 2000-002879 | 1/2000 |
| JP | 2000-029035 | 1/2000 |
| JP | 2000-056311 | 2/2000 |
| JP | 2000-066165 | 3/2000 |
| JP | 2000-066218 | 3/2000 |
| JP | 2000-093866 | 4/2000 |
| JP | 2000-137235 | 5/2000 |

| | | | | | |
|---|---|---|---|---|---|
| JP | 2000-147528 | 5/2000 | JP | 10-2002-0015004 | 2/2002 |
| JP | 2000-161215 | 6/2000 | JP | 2002-049045 A1 | 2/2002 |
| JP | 2000-193988 | 7/2000 | JP | 200240398 | 2/2002 |
| JP | 2000-241824 | 9/2000 | JP | 2002-079160 | 3/2002 |
| JP | 2000-284295 | 10/2000 | JP | 2002-080321 | 3/2002 |
| JP | 2000-292799 | 10/2000 | JP | 2002-082340 A1 | 3/2002 |
| JP | 2000-310759 | 11/2000 | JP | 2002-090759 A1 | 3/2002 |
| JP | 2000-310784 | 11/2000 | JP | 2002-090760 A1 | 3/2002 |
| JP | 2000-338501 | 12/2000 | JP | 2002-107740 A1 | 4/2002 |
| JP | 2001-005401 | 1/2001 | JP | 2002-122870 | 4/2002 |
| JP | 2001-005405 | 1/2001 | JP | 2002-122872 A1 | 4/2002 |
| JP | 2001-013506 | 1/2001 | JP | 2002-122873 A1 | 4/2002 |
| JP | 2001-033793 | 2/2001 | JP | 2002-131762 | 5/2002 |
| JP | 2001-042341 | 2/2001 | JP | 2002-139734 | 5/2002 |
| JP | 2001-051284 | 2/2001 | JP | 2002-156518 | 5/2002 |
| JP | 2001-066615 | 3/2001 | JP | 2002-169166 | 6/2002 |
| JP | 2001-091727 | 4/2001 | JP | 2002-169167 | 6/2002 |
| JP | 2001-117105 | 4/2001 | JP | 2002-182222 | 6/2002 |
| JP | 2001-117109 | 4/2001 | JP | 2002-202512 A1 | 7/2002 |
| JP | 2001-133745 | 5/2001 | JP | 2002-202514 A1 | 7/2002 |
| JP | 2001-133794 | 5/2001 | JP | 2002-214626 A1 | 7/2002 |
| JP | 2001-133799 | 5/2001 | JP | 2002-229042 | 8/2002 |
| JP | 2001-142074 | 5/2001 | JP | 2002-229471 | 8/2002 |
| JP | 2001-147437 | 5/2001 | JP | 2002-236276 | 8/2002 |
| JP | 2001-154211 | 6/2001 | JP | 2002-258299 | 8/2002 |
| JP | 2001-166272 | 6/2001 | JP | 2002229471 A | 8/2002 |
| JP | 2001-166310 | 6/2001 | JP | 2002-236292 | 9/2002 |
| JP | 2001-183683 | 7/2001 | JP | 2002-277865 | 9/2002 |
| JP | 2001-209052 | 8/2001 | JP | 2002-277866 | 9/2002 |
| JP | 2001-209056 | 8/2001 | JP | 2002-277881 | 9/2002 |
| JP | 2001-209057 | 8/2001 | JP | 2002-287156 | 10/2002 |
| JP | 2001-209058 | 8/2001 | JP | 2002-296605 | 10/2002 |
| JP | 2001-209060 | 8/2001 | JP | 2002-311438 | 10/2002 |
| JP | 2001-222017 | 8/2001 | JP | 2002-311440 | 10/2002 |
| JP | 2001-235758 | 8/2001 | JP | 2002-311442 | 10/2002 |
| JP | 2001-215459 | 9/2001 | JP | 2002-323687 | 11/2002 |
| JP | 2001-255542 | 9/2001 | JP | 2002-323694 | 11/2002 |
| JP | 2001-264782 | 9/2001 | JP | 2002-333628 | 11/2002 |
| JP | 2001-201750 | 10/2001 | JP | 2002-333635 | 11/2002 |
| JP | 2001-272640 | 10/2001 | JP | 2002-333843 | 11/2002 |
| JP | 2001-281675 | 10/2001 | JP | 2002-341329 | 11/2002 |
| JP | 2001-281678 | 10/2001 | JP | 2002-341355 | 11/2002 |
| JP | 2001-282126 | 10/2001 | JP | 2002-341356 | 11/2002 |
| JP | 2001-305563 | 10/2001 | JP | 2002-341357 | 11/2002 |
| JP | 2001-330837 | 11/2001 | JP | 2002-341358 | 11/2002 |
| JP | 2001-330840 A1 | 11/2001 | JP | 2002-341359 | 11/2002 |
| JP | 2001-356353 | 12/2001 | JP | 2002-341362 | 11/2002 |
| JP | 2001-356354 A1 | 12/2001 | KR | 2000-035302 A1 | 6/2000 |
| JP | 2002-014360 A1 | 1/2002 | | | |
| JP | 2002-023176 A1 | 1/2002 | * cited by examiner | | |

DEVICE AND METHOD FOR FABRICATING LIQUID CRYSTAL DISPLAY DEVICE

This application claims the benefit of the Korean Application No. P2002-71227 filed on Nov. 15, 2002, which is hereby incorporated by reference for all purposes as if fully set forth herein. This application incorporates by reference two co-pending application Ser. No. 10/184,096, filed on Jun. 28, 2002, entitled "SYSTEM AND METHOD FOR MANUFACTURING LIQUID CRYSTAL DISPLAY DEVICES" and Ser. No. 10/184,088, filed on Jun. 28, 2002, entitled "SYSTEM FOR FABRICATING LIQUID CRYSTAL DISPLAY AND METHOD OF FABRICATING LIQUID CRYSTAL DISPLAY USING THE SAME" as if fully set forth herein.

BACKGROUND OF THE INVENTION

1. Field of the Invention

The present invention relates to liquid crystal display (LCD) devices, and more particularly to a substrate bonding device facilitating the fabrication of LCD devices formed via liquid crystal dispensing methods and a method for fabricating LCD devices using the same.

2. Background of the Related Art

With the expansion of the information society, a need has arisen for displays capable of producing high quality images in thin, lightweight packages and that consume little power. To meet such needs, research has produced a variety of flat panel display devices, including liquid crystal displays (LCD), plasma displays (PDP), electro luminescent displays (ELD), and vacuum fluorescent displays (VFD). Some of these display technologies have already been applied in information displays.

Of the various types of flat panel display devices, LCD devices are very widely used. In fact, in portable devices, such as notebook PC computers, LCD technology has already replaced cathode ray tubes (CRT) as the display of choice. Moreover, even in desktop PCs and in TV monitors, LCDs devices are becoming more common.

Despite various technical developments in LCD technology, however, research in enhancing the picture quality of LCD devices has been lacking compared to research in other features and advantages of LCD devices. Therefore, to increase the use of LCD devices as displays in various fields of application, LCD devices capable of expressing high quality images (e.g., images having a high resolution and a high luminance) with large-sized screens, while still maintaining a light weight, minimal dimensions, and low power consumption must be developed.

LCDs generally include an LCD panel for displaying pictures and a driving part for providing driving signals to the LCD panel. Typically, LCD panels include first and second glass substrates bonded to each other while being spaced apart by a cell gap, wherein a layer of liquid crystal material is injected into the cell gap.

The first glass substrate (i.e., thin film transistor (TFT) array substrate), supports a plurality of gate lines spaced apart from each other at a fixed interval and extending along a first direction; a plurality of data lines spaced apart from each other at a fixed interval and extending along a second direction, substantially perpendicular to the first direction, wherein pixel regions are defined by crossings of the gate and data lines; a plurality of pixel electrodes arranged in a matrix pattern within respective ones of the pixel regions; and a plurality of thin film transistors (TFTs) capable of transmitting signals from the data lines to corresponding ones of the pixel electrodes in response to signals applied to respective ones of the gate lines.

The second glass substrate (i.e., color filter substrate) supports a black matrix layer for preventing light leakage in areas outside the pixel regions; a color filter layer (R,G,B) for selectively transmitting light having predetermined wavelengths; and a common electrode for displaying pictures. Common electrodes of In-Plane Switching (IPS) mode LCD devices, however, are formed on the first substrate.

Uniformity of the cell gap is maintained by spacers arranged between the first and second glass substrates, bonded together by a seal pattern. The seal pattern includes a liquid crystal injection opening allowing liquid crystal material to be injected into the cell gap by a capillary phenomenon. Upon injecting liquid crystal material into the cell gap through the liquid crystal injection opening, the layer of liquid crystal material is thus formed.

Fabricating LCD devices using the aforementioned related art liquid crystal injection method, however, is disadvantageous because the productivity of such liquid crystal injection methods is poor. More specifically, after LCD panels are formed by a cutting process, liquid crystal material is injected into the cell gap by dipping the liquid crystal injection opening of each LCD panel into a reservoir of liquid crystal material while pressure in the cell gap is maintained in a vacuum state. Moreover, as the size of the LCD panel increases, the risk of defects within the LCD panel increases due to imperfect filling characteristics of the liquid crystal material. Further, the liquid crystal injection methods are often complicated, time consuming, and require many liquid crystal injection devices that occupy excessive amounts of space.

In light of the aforementioned problems associated with liquid crystal injection methods, fabricating LCD devices by dispensing liquid crystal material have been the subject of recent research. More specifically, Japanese Patent Application Nos. H11-089612 and H11-172903 can be understood to disclose a method of dispensing liquid crystal material wherein, after liquid crystal material is dispensed and sealant material is coated onto one of the first and second substrates, the other of the first and second substrates is positioned on the one of the first and second substrates and the two substrates are bonded together under a vacuum.

Generally, liquid crystal material dispensing methods are advantageous over liquid crystal material injection methods because they reduce the number of fabrication steps required to fabricate LCD panels (e.g., formation of the liquid crystal injection hole, injection of the liquid crystal material, sealing of the liquid crystal injection hole, etc., are omitted), thereby simplifying fabrication of LCD panels.

FIGS. 1 and 2 illustrate a related art substrate bonding device used in fabricating LCD panels formed with dispensed liquid crystal material.

Referring to FIGS. 1 and 2, the related art LCD device substrate bonding device is provided with a frame 10, an upper stage 21, a lower stage 22, a sealant dispensing part (not shown), a liquid crystal material dispensing part 30, an upper chamber unit 31, a lower chamber unit 32, chamber moving means, and stage moving means.

The sealant dispensing part (not shown) and liquid crystal dispensing part 30 are typically provided at a side portion of the frame 10. Moreover, the upper and lower chamber units 31 and 32, respectively, can be joined to each other to bond substrates of an LCD panel.

The chamber moving means generally includes a driving motor 40 for moving the lower chamber unit 32 laterally to predetermined positions where the substrates are to be bonded (S2) and where the sealant material is to be coated and the liquid crystal material is to be dispensed (S1). The stage moving means includes a driving motor 50 for raising and lowering the upper stage 21 to predetermined positions.

A method for fabricating an LCD panel using the related art substrate bonding device will now be described in greater detail.

A first substrate 51 is positioned on the lower stage 22 of the lower chamber unit 32 and the chamber moving means 40 moves the lower chamber unit 32 under the upper chamber unit 31 such that the lower stage 22 is beneath the upper stage 21. Next, the driving motor 50 of the stage moving means lowers the upper stage 21 to a predetermined position such that the first substrate 51 is secured to the lowered upper stage 21. Subsequently, the upper stage 21, to which the first substrate 51 is secured, is raised to a predetermined position. The chamber moving means 40 then moves the lower chamber unit 32 to a position where a second substrate 52 is loaded on the lower stage 22. Subsequently, the chamber moving means 40 moves the lower chamber unit 32 to a first predetermined position S1 (as shown in FIG. 1). At the first predetermined position S1, sealant material coating and liquid crystal material dispensing processes are applied to the second substrate 52 using the sealant dispensing part (not shown) and the liquid crystal dispensing part 30, respectively. After the coating the sealant material and dispensing the liquid crystal material, the chamber moving means 40 moves the lower chamber unit 32 to a second predetermined position S2 (as shown in FIG. 2) where the first and second substrates 51 and 52, respectively, can be bonded together. Next, the upper and lower chamber units 31 and 32, respectively, are joined to each other such that the upper and lower stages 21 and 22, respectively, are arranged within an enclosed space. A vacuum is then created within the enclosed space using an evacuating means (not shown). After the vacuum is created, the stage moving means 50 lowers the upper stage 21 such that the first substrate 51, secured to the upper stage 21, contacts the second substrate 52 on the lower stage 22. The upper stage 21 is lowered until the two substrates become bonded, thereby completing the fabrication of the LCD panel.

Use of the aforementioned related art substrate LCD device substrate bonding device is disadvantageous, however, because the overall size of the aforementioned related art substrate bonding device is excessively large, especially when designed to fabricate large-sized LCD panels. The excessively large overall size of the related substrate bonding device creates problems when designing LCD device fabrication processes because an adequate amount of space must be provided to install the related art substrate bonding device while preserving the space in which other apparatuses of other processes are located.

Further, while the related art bonding device applies sealant and liquid crystal material to substrates supporting thin film transistors and color filter layers and bonds the two substrates together, the related art bonding device may increases the overall amount of time required to fabricate one LCD panel. More specifically, because liquid crystal material is dispensed, sealant material is coated, and substrates are bonded all using the same apparatus, substrates transported from preceding processes must stand idle until the processes performed by the related art substrate bonding device are complete. Moreover, the overall productivity of the LCD fabrication process is reduced since the related art substrate bonding device cannot process material transported thereto while other fabrication processes are in progress.

Still further, an imperfect seal can be formed between the joined upper and lower chamber units 31 and 32, respectively. As a result, air may leak from the external environment into the enclosed space defined by the upper and lower chamber units and the substrates may become damaged during bonding, thereby creating a defective bond.

Moreover, a substantially high degree of alignment is required to position the lower chamber unit 32 and successfully bond the two substrates. Such alignment can be extremely difficult and complicated and unduly lengthen the entire process of fabricating the LCD panel. Accordingly, the many positions the lower chamber 32 is required to move to (e.g., the first position S1 for dispensing the liquid crystal and coating the sealant material onto the second substrate 52, the second position S2 for bonding the two substrates, etc.) prevent the substrates from being properly aligned for a successful bonding.

SUMMARY OF THE INVENTION

Accordingly, the present invention is directed to a substrate bonding device and a method for fabricating an LCD device that substantially obviates one or more of the problems due to limitations and disadvantages of the related art.

An advantage of the present invention provides a substrate bonding device and a method for fabricating LCD panels wherein the overall structure of the device is simplified and the overall size of the device is reduced such that a layout of LCD fabrication processes may be simplified, smooth alignment may be provided between substrates, and a period of time required to fabricate a single LCD panel may be reduced to facilitate the smooth progression of preceding and subsequent LCD fabrication processes.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a device for fabricating an LCD panel may, for example, include a base frame for providing an outer appearance; a lower chamber unit mounted to the base frame; an upper chamber unit positioned over the lower chamber unit and moveable with respect to the base frame; chamber moving means mounted to the base frame for raising and lowering the upper chamber unit; an upper stage and a lower stage provided within interior spaces of the upper and lower chamber units, respectively, for securing a first substrate and a second substrate, respectively; and sealing means provided to at least one surface of the upper and lower chamber units for sealing an interior space created upon joining of the upper and lower chamber units, wherein the substrates are arranged with the sealed interior space.

In another aspect of the present invention, a method for fabricating an LCD device may, for example, include loading a first substrate onto an upper stage; loading a second substrate onto a lower stage; lowering an upper chamber unit to seal an interior space from an exterior space, wherein the upper and lower stages are arranged within the sealed interior space, wherein the sealed interior space is sealed using sealing means; evacuating the sealed interior space; moving the upper chamber unit and the upper stage to align the first and second substrates and to contact the first substrate to a sealant formed on the second substrate;

venting the sealed interior space, wherein the first substrate is contacted to sealant on the second substrate, wherein pressure is applied to the first and second substrates; and unloading the pressed first and second substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to describe the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

Figure 1:
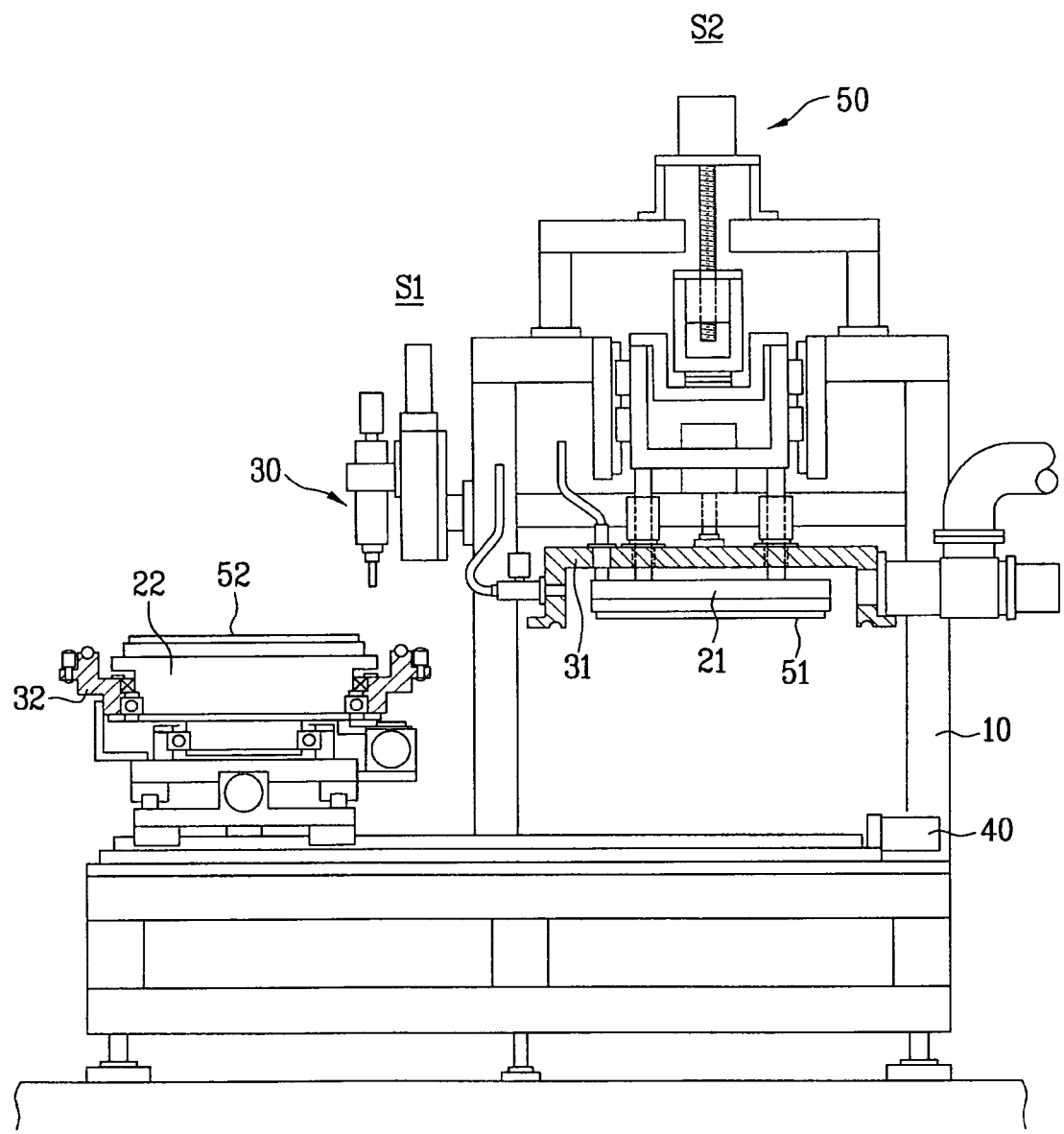
FIGS. 1 and 2 illustrate a related art substrate bonding device for use in fabricating LCD panels formed via liquid crystal material dispensing methods.
Figure 2:
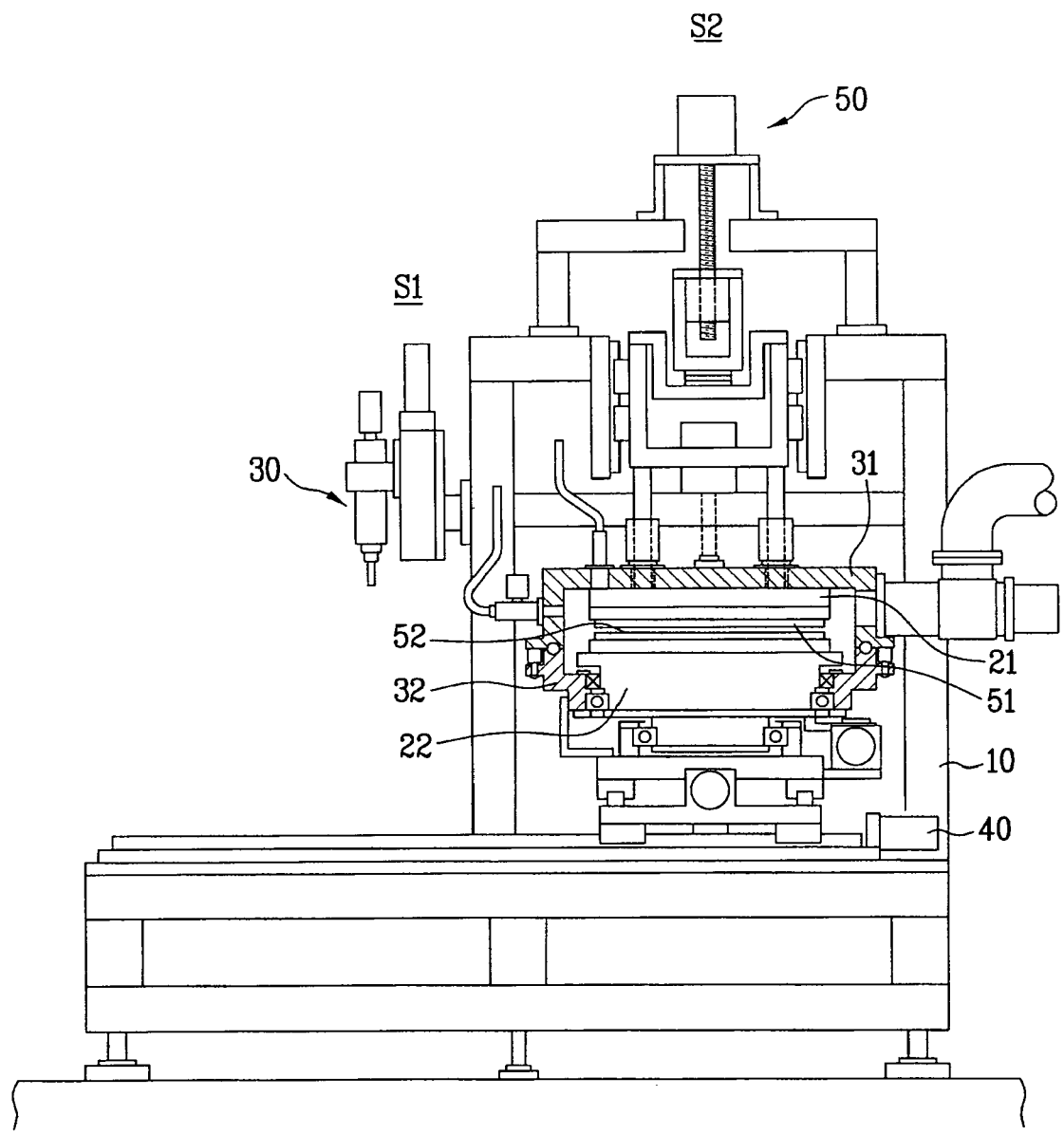
Figure 3:
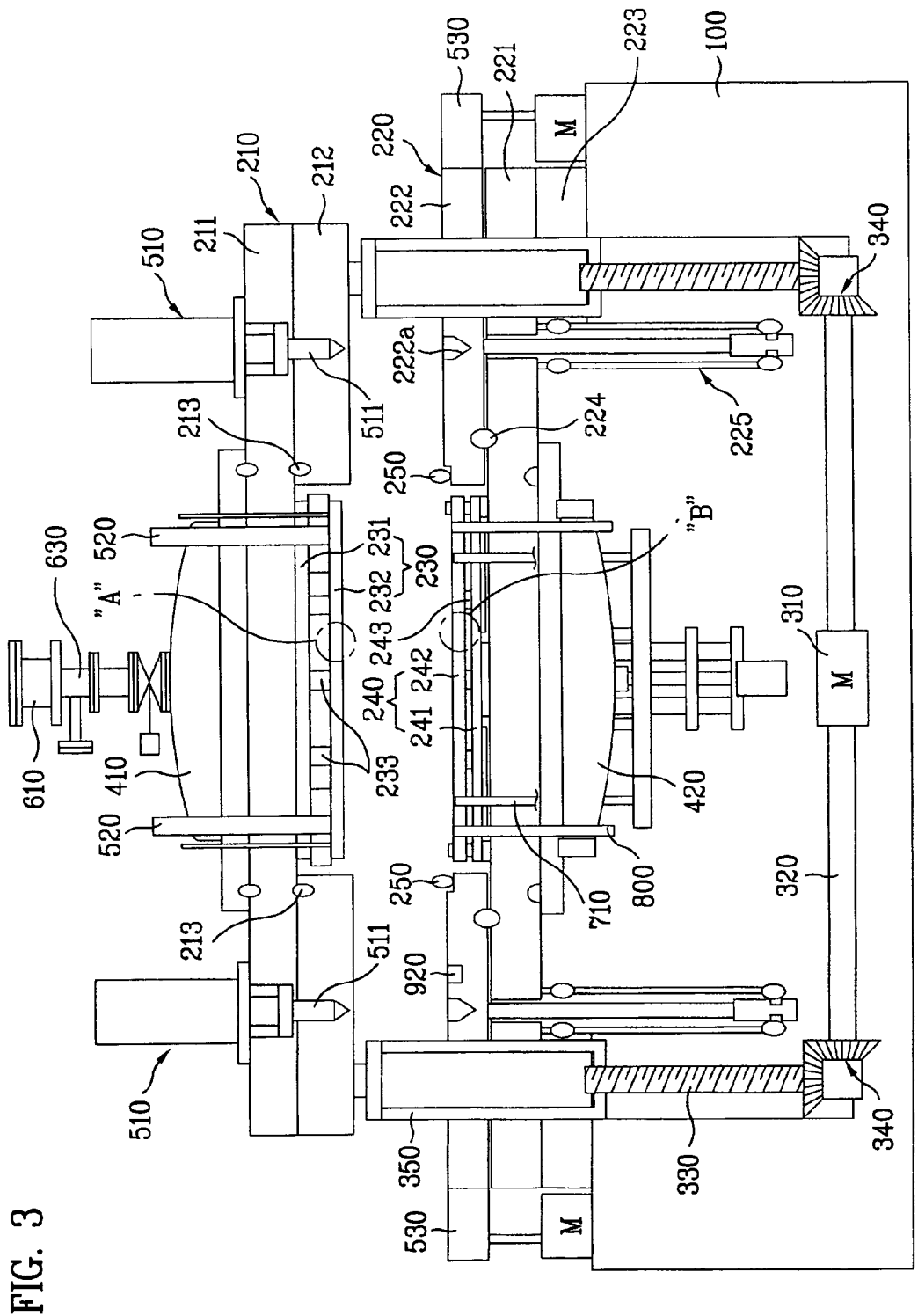
FIG. 3 illustrates a substrate bonding device for fabricating LCD panels in accordance with the principles of the present invention in an unloaded state.

FIG. 3 illustrates a substrate bonding device for fabricating LCD panels in accordance with the principles of the present invention in an unloaded state.

Figure 5:
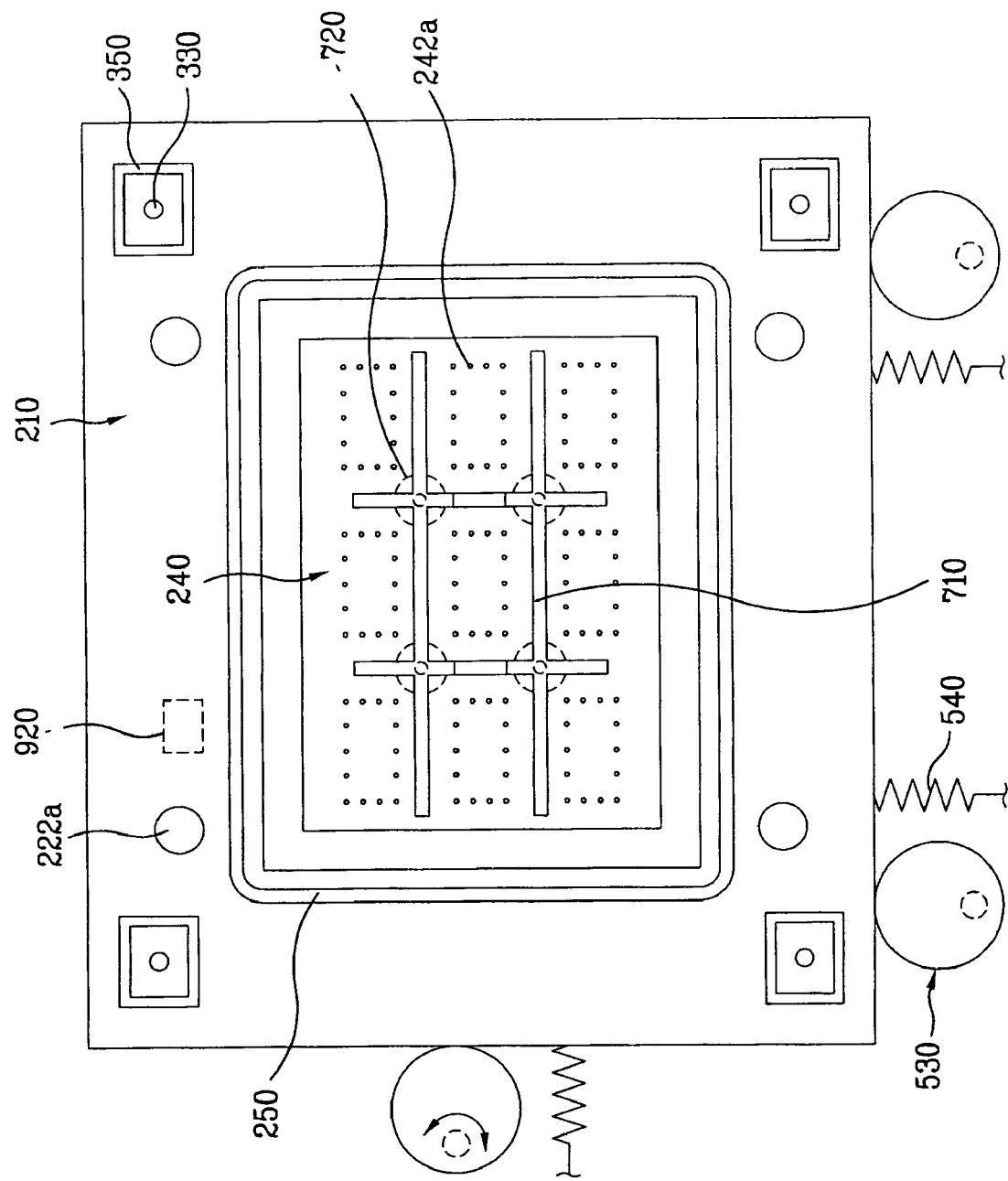
FIG. 5 illustrates a plan view of an arrangement of rotatable cams within the substrate bonding device in accordance with the principles of the present invention.
Figure 6:
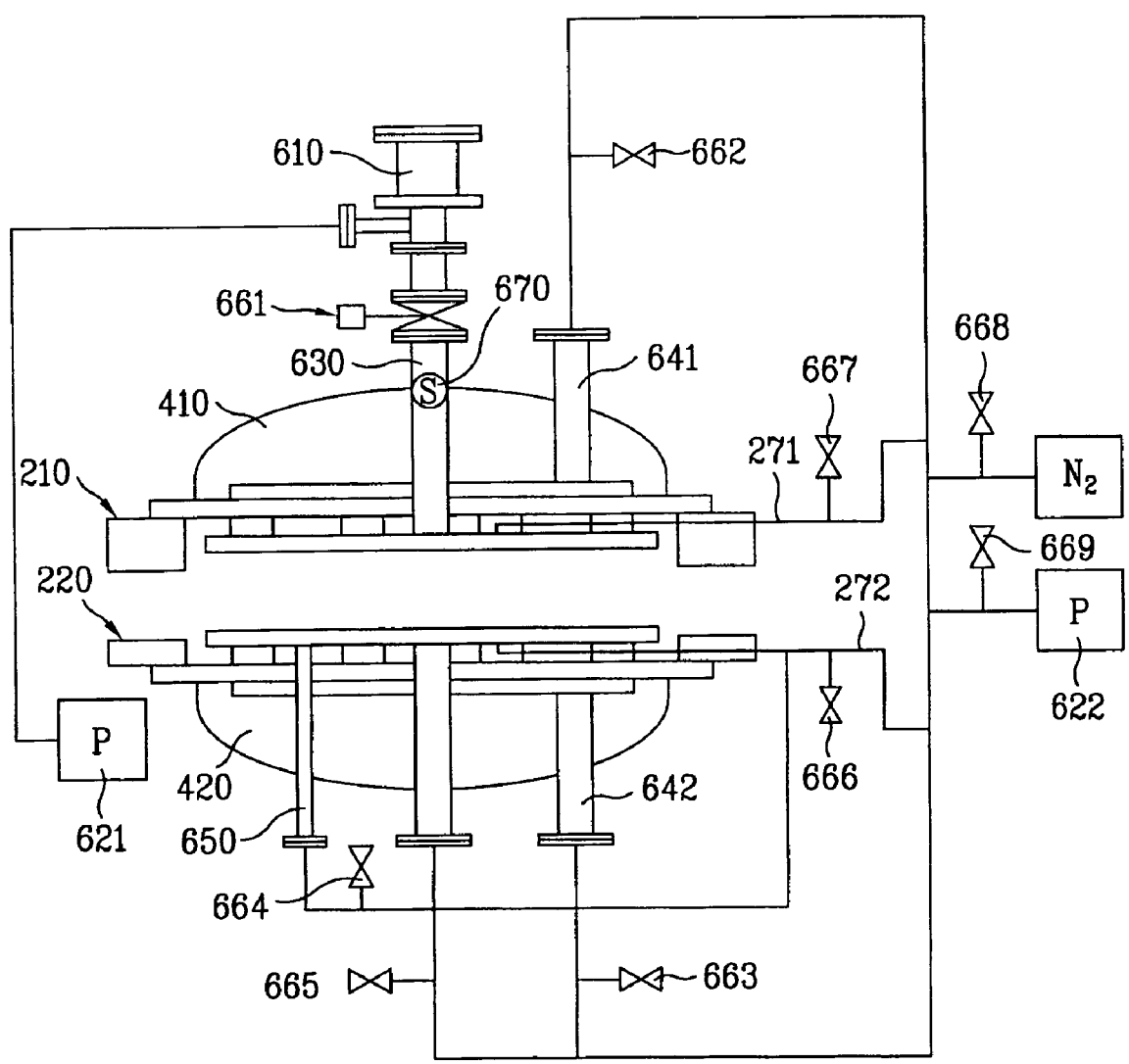
FIG. 6 schematically illustrates vacuum pumps and pipelines within the substrate bonding device in accordance with the principles of the present invention.
Figure 7:
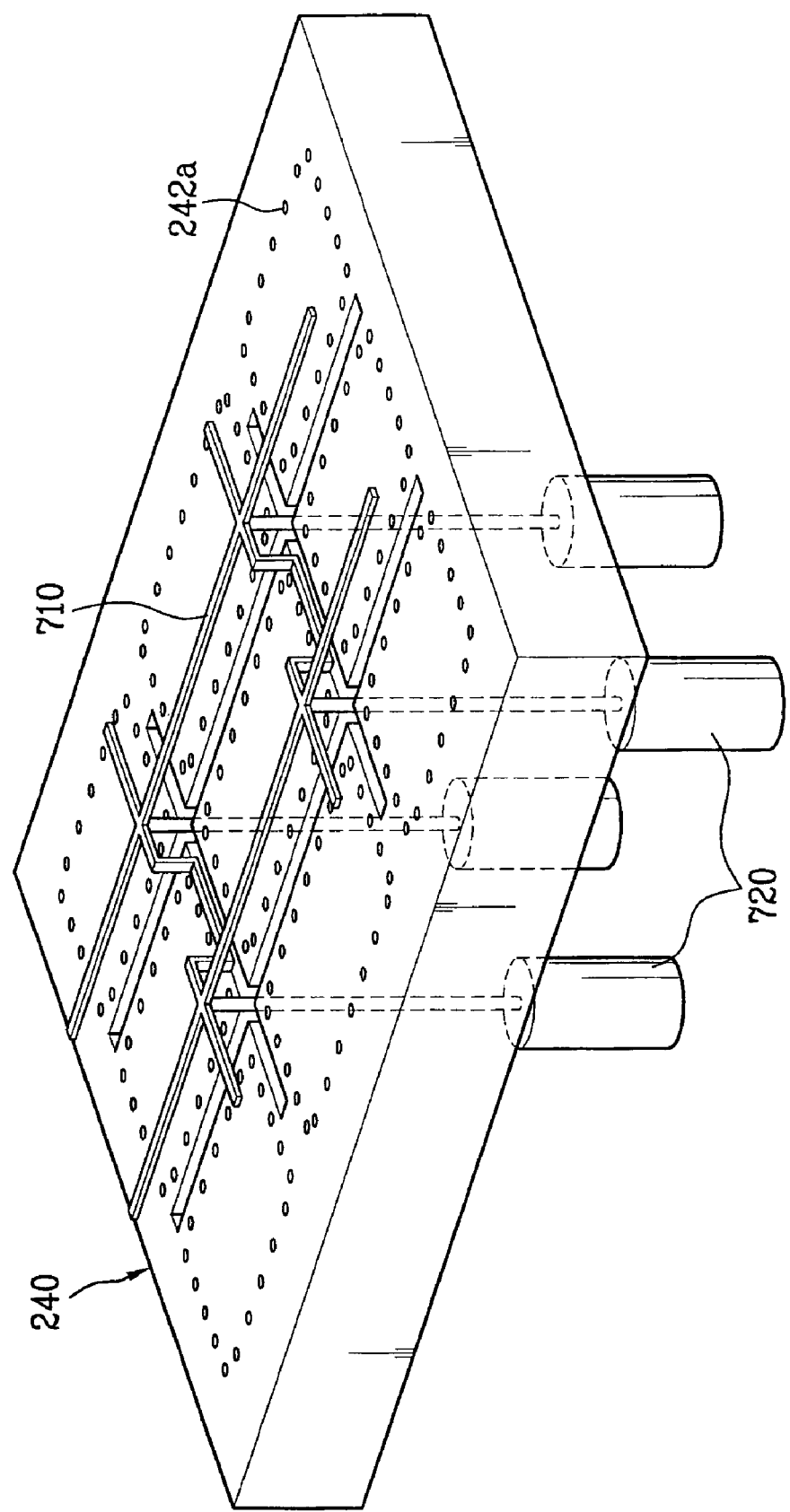
FIG. 7 illustrates a perspective view of support means within the substrate bonding device in accordance with the principles of the present invention.
Figure 8:
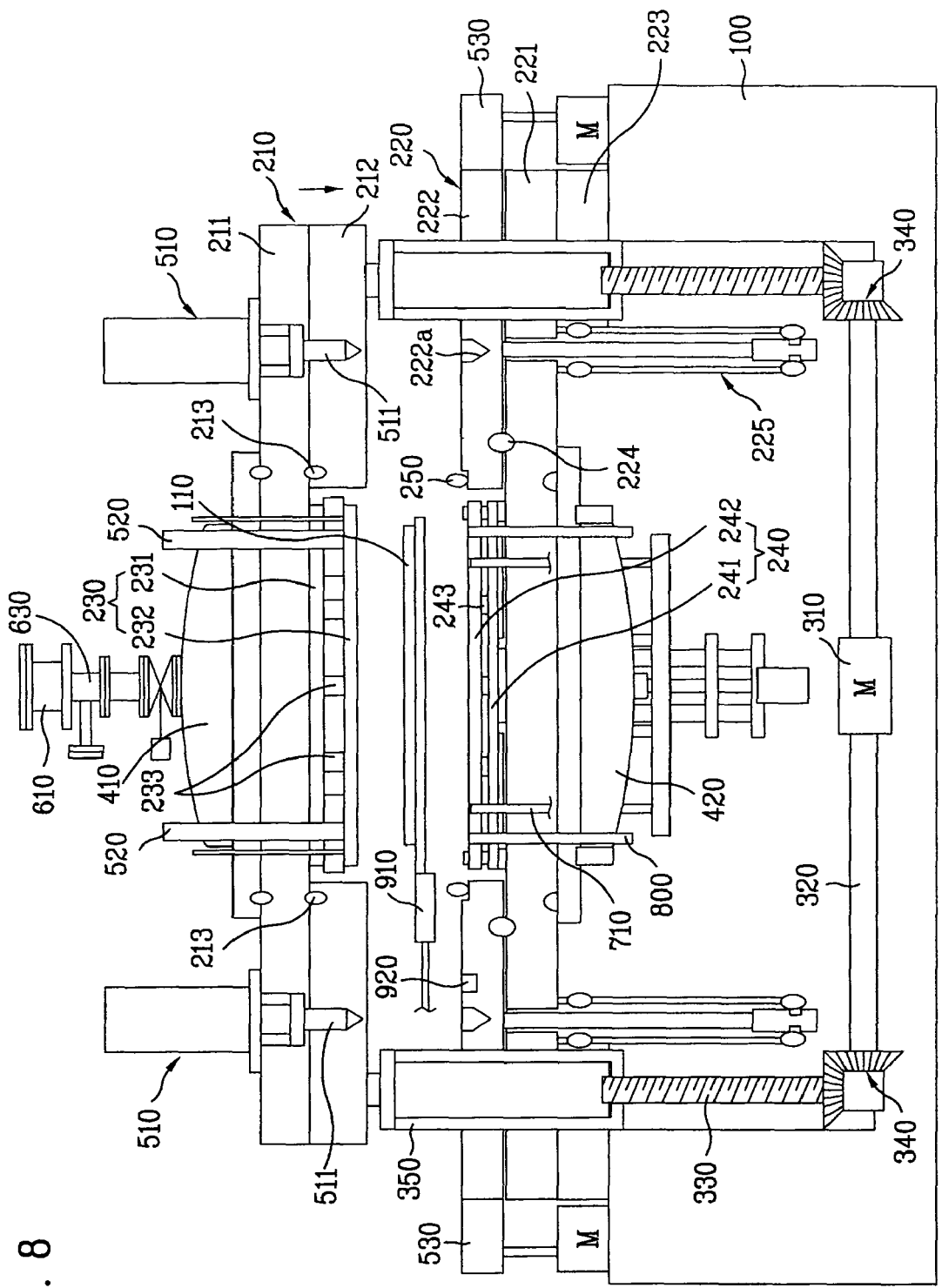
FIG. 8 illustrates the loading of a first substrate within the substrate bonding device in accordance with the principles of the present invention.

Referring to generally to FIG. 3, the substrate bonding device of the present invention may, for example, include a base frame 100; an upper chamber unit 210; a lower chamber unit 220; chamber moving means (e.g., 310, 320, 330, 340, and 350); an upper stage 230; and a lower stage 240; sealing means (e.g., 250); an upper low vacuum unit 410; a lower low vacuum unit 420; alignment means (e.g., 510, 520, 530, and 540) shown, for example, in FIG. 5, vacuum pumping means (e.g., 610, 621, and 622) shown, for example, in FIG. 6; support means (e.g., 710 and 720), shown for example, in FIG. 7; and photosetting means 800.

In one aspect of the present invention, the base frame 100 may be fixed to a supporting structure or surface (e.g., the ground), may form the exterior appearance of the bonding device, and may support different components discussed in greater detail below.

In another aspect of the present invention, upper and lower stages 230 and 240 may be fixed to the upper chamber unit 210 and the lower chamber unit 220, respectively. As will be described in greater detail below, the upper and lower chamber units 210 and 220 may be selectively joined to each other to define an interior space.

The upper chamber unit 210 may, for example, include an upper base 211 that may be exposed to an external environment and an upper chamber plate 212 immovably attached to a bottom surface of the periphery of the upper base 211. In one aspect of the present invention, the upper chamber plate 212 may be provided as a rectangular rim and define an interior space within which the upper stage 230 is fixed. Since the upper stage 230 is fixed to the upper chamber unit 210, the upper stage may be raised and lowered with the upper chamber unit 210. In another aspect of the present invention, a first seal member 213 may be arranged between the upper base 211 and the upper chamber plate 212 of the upper chamber unit 210 to seal the interior space defined by the upper chamber plate 212 from the external environment. In one aspect of the present invention, the first seal member 213 may be provided as a gasket, an O-ring, or the like, suitable for sealing.

The lower chamber unit 220 may, for example, include a lower base 221 fixed to the base frame 100 and a lower chamber plate 222 arranged above a top surface of the periphery of the lower base 221. In one aspect of the present invention, the lower chamber plate 222 maybe provided as a rectangular rim and define an interior space within the which the lower stage 240 is fixed. In one aspect of the present invention the lower chamber plate 222 may be movable in left, right, forward, and backward (i.e., lateral) directions with respect to the lower base 221. In another aspect of the present invention, the lower chamber unit 220 may include a fixing plate 223 for fixing the lower base 221 to the base frame 100. In yet another aspect of the present invention, a second seal member 224 may be arranged between the lower base 221 and the lower chamber plate 222 of the lower chamber unit 220 and may seal the interior space defined by the lower chamber plate 222 from a the external environment. In one aspect of the present invention, the second seal member 224 may be provided as a gasket, an o-ring, or the like, suitable for sealing.

According to the principles of the present invention, at least one support part 225 may be arranged between the lower base 221 and the lower chamber plate 222 for maintaining the lower chamber plate 222 a predetermined a distance from the upper surface of the lower base 221. The support part 225 may include a first end attached to a bottom portion of the lower chamber plate 222 and a second end that is movable in lateral directions with respect to the lower base 221 and is attached to a piece that is attached to a bottom portion of the lower base 221. Accordingly, the support part 225 enables the lower chamber plate 222 to move in left, right, forward, and backward directions relative to the lower base 221.

Referring still to FIG. 3, the aforementioned chamber moving means may, for example, include a driving motor 310 fixed to the base frame 100, a driving shaft 320 coupled to the driving motor 310, a connecting shaft 330 arranged substantially perpendicular to the driving shaft 320 for receiving a driving force from the driving shaft 320, a connecting part 340 for connecting the driving shaft 320 to the connecting shaft 330, and a jack part 350 mounted at an end of the connecting shaft 330.

In one aspect of the present invention, the driving motor 310 may be arranged within an interior bottom portion of the base frame 100 and may be provided as a bilateral shaft motor, having shafts horizontally projecting from both sides of the driving motor 310. The driving shaft 320 may be connected to the driving motor 310 and transmit driving forces along a horizontal direction to the connecting part 340 while the connecting shaft 330 may be connected to the connecting part 340 to transmit the driving force along a vertical direction with respect to the driving shaft 320. The jack part 350 may be provided at the end of the connecting shaft 330, may be connected to the upper chamber unit 210, and may include a nut housing to move the upper chamber unit 210 upwardly and downwardly, depending on a rotation direction of rotation of the connecting shaft 330. The connecting part 340 may be provided as a system of bevel gears to translate a rotational force supplied from the driving shaft 320 along a horizontal direction into a vertical rotational force to the connecting shaft 330.

According to the principles of the present invention, the upper and lower stages 230 and 240, respectively, may each include a fixing plate 231 and 241, respectively, fixed to a respective one of the upper chamber unit 210 and the lower chamber unit 220; a securing plate 232 and 242, respectively, for securing the upper and lower substrates; and a plurality of fixing blocks 233 and 243, respectively, arranged between respective pairs of the fixing plates 231 and 241 and the securing plates 232 and 242. In one aspect of the present invention, the securing plates 232 and 242 may each be provided as an electrostatic chuck (ESC) formed of a material such as polyimide for securing a substrate to a respective one of the stages by applying an electrostatic charge.

Figure 4A:
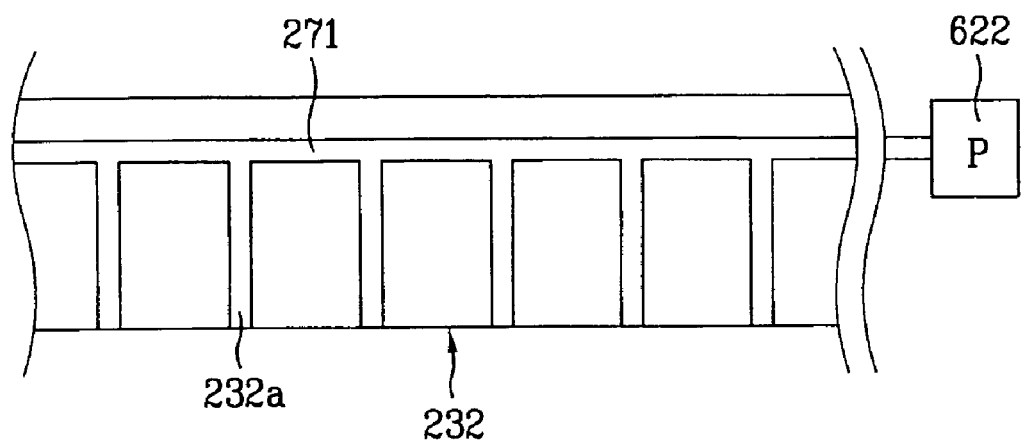
FIGS. 4A and 4B illustrate the interior structures of stages within the substrate bonding device in accordance with the principles of the present invention.
Figure 4B:
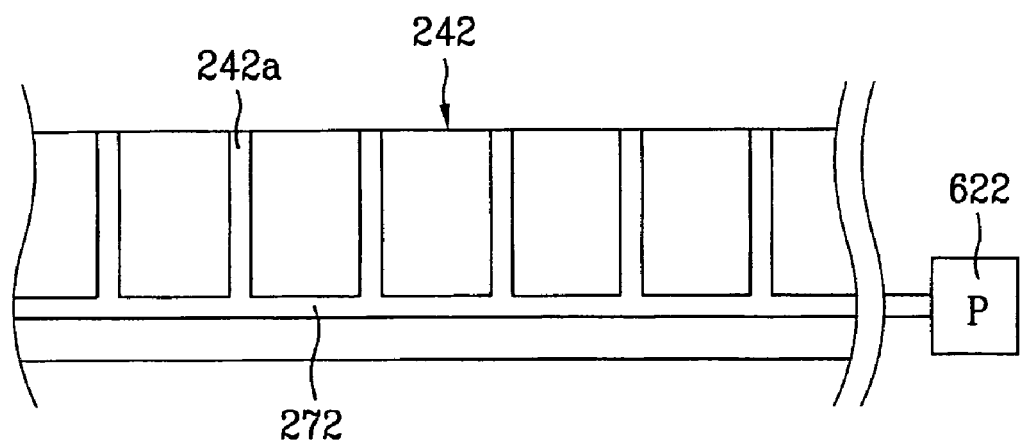

FIGS. 4A and 4B illustrate the interior structures of stages within the substrate bonding device in accordance with the principles of the present invention.

FIGS. 4A and 4B illustrate enlarged sectional views of "A" and "B" regions, respectively, shown in FIG. 3. Accordingly, and while referring to FIGS. 4A and 4B, each of the securing plates 232 and 242 may, for example, additionally include a plurality of holes 232a and 242a, respectively, for transmitting a suction force. Accordingly, each of the plurality of holes 232a and 242a may be in communication with a respective one of a vacuum pipeline 271 and 272, respectively, formed within a respective one of the upper stage 230 and lower stage 240. In one aspect of the present invention, each vacuum pipeline 271 and 272 may be connected to a vacuum pump means (e.g., 622, as shown in FIG. 6) for generating the suction force.

Referring back to FIG. 3, the sealing means 250 (hereinafter referred to as a third seal member) may be provided as an O-ring, formed of a material such as rubber, and fitted along a top surface of the lower chamber plate 222 of the lower chamber unit 220. In one aspect of the present invention, the third seal member 250 may project from the top surface of the lower chamber plate 222 to a predetermined height and be formed to a predetermined thickness sufficient to prevent substrates, secured by respective ones of the upper and lower stages 230 and 240, from becoming proximately arranged next to each other upon initially joining the upper and lower chamber units 210 and 220, as will be discussed in greater detail below. In another aspect of the present invention, the thickness of the third seal member 250 may be sufficient to permit the substrates to contact each other when the third seal member 250 is compressed.

In one aspect of the present invention, the upper and lower low vacuum chamber units 410 and 420, respectively, may each include interior spaces capable of being substantially evacuated. Further, the upper and lower low vacuum chamber units 410 and 420 may contact a top surface of the upper chamber unit 210 and a bottom surface of the lower chamber unit 220, respectively. When the upper chamber unit 210 and the lower chamber unit 220 are joined, an interior space may be defined and sealed by the joined chamber units. Moreover, the upper and lower stages 230 and 240 may be arranged within the sealed interior space such that, when the sealed interior space is evacuated, the upper and lower stages 230 and 240 may become bent due to a pressure difference between the vacuum created within the sealed interior space and an atmospheric pressure of the external environment. As the degree to which the upper and lower stages 230 and 240 bend may be greatest at the central portions of the upper and lower stages, vacuums created within the interior spaces of the upper and lower low vacuum chamber units 410 and 420 may minimize the degree to which the upper and lower stages 230 and 240 bend. In one aspect of the present invention, the interior spaces of the upper and lower low vacuum chamber units 410 and 420 may be greater at a central part thereof as compared to a peripheral part thereof.

According to the principles of the present invention, the aforementioned alignment means may be used to align substrates 110 and 120 secured to upper and lower stages 230 and 240, respectively. In one aspect of the present invention, during alignment of the substrates 110 and 120, the lower stage 240 may be kept substantially stationary while the position of the upper stage 230 is adjusted in accordance with the position of the lower chamber plate 222, adjustable with the alignment means.

In one aspect of the present invention, the alignment means may, for example, include a plurality of linear actuators 510, a plurality of alignment cameras 520, a plurality of cams 530, and a plurality of restoring means 540. The plurality of linear actuators 510 may be arranged along a periphery of the upper chamber unit 210 and may lower corresponding ones of the plurality of movable shafts 511 until the movable shafts 511 are received within respective holes 222a, provided in the lower chamber plate 222 of the lower chamber unit 220. Each of the plurality of linear actuators 510 may include a load cell (not shown) that may facilitate the leveling of the working surfaces of upper and lower stages 230 and 240 (e.g., the surface of the stages in contact with the substrates) by adjusting a tilt angle of the upper stage 230 to be substantially equal to a tilt angle of the lower stage 240. Accordingly, the linear actuators 510 may adjust the orientation of the working surface of the upper stage 230 to be substantially parallel to the working surface of the lower stage 240. In one aspect of the present invention, the linear actuators 510 may be provided at at least two diagonally opposed corners of the upper chamber unit 210. In another aspect of the present invention, the linear actuators 510 may be provided at four corners of the upper chamber unit 210.

The dimensions of the hole 222a may be substantially conformal with the dimensions of end portions of respective ones of the plurality of movable shafts 511. In one aspect of the present invention, the dimensions of the hole 222a and the end portion of the moveable shaft 511 may form a tapered structure, having sloped surfaces. Therefore, even if the movable shafts 511 and the holes 222a are not exactly aligned initially, the end portions of the moveable shafts 511 may contact, and be guided by the sloped surface within the holes 222a such that the moveable shafts 511 and the holes 222a may eventually be substantially aligned.

The alignment camera 520 may be mounted such that an alignment marks (not shown) formed on the substrates (not shown), secured by the upper or lower stages 230 or 240, may be observed through the upper chamber unit 210 or through the lower chamber unit 220. In one aspect of the present invention, at least two alignment cameras 520 may be used to observe at least two diagonally arranged corners of a substrate, to be secured by one of stages 230 or 240.

FIG. 5 illustrates a plan view of an arrangement of the rotatable cams in the substrate bonding device in accordance with the principles of the present invention.

Referring to FIGS. 3 and 5, cams 530 may be rotatably arranged to selectively contact a peripheral surface of the lower chamber plate 222. In one aspect of the present invention, three cams 530 may be provided within the substrate bonding device of the present invention. In another aspect of the present invention, each of the cams may be eccentrically rotatable such that, upon rotating, the lower chamber plate 222 may be pushed in a predetermined direction. In accordance with the principles of the present invention, the lower chamber unit may be defined by four sides, wherein a first pair of opposing sides may be longer than a second pair of opposing sides. Accordingly, two cams 530 may be arranged to selectively contact one side of the first pair of opposing sides and one cam 530 may be arranged to selectively contact a middle portion of one side of the second pair of opposing sides such that the lower chamber plate 222 may be movable in the left, right, forward, and backward directions. Individual ones of the restoring means 540 may be provided adjacent to a respective cam 530 and may exert a restoring force in a direction opposite to the direction the corresponding cam 530 pushes lower chamber plate 222. In one aspect of the present invention, the restoring means 540 may be provided as a spring having a first end connected to the base frame 100 and a second end connected to the peripheral surface of the lower chamber plate 222.

FIG. 6 schematically illustrates vacuum pumps and pipelines within the substrate bonding device in accordance with the principles of the present invention.

Referring to FIGS. 3 and 6, the aforementioned vacuum pumping means 610, 621, and 622 may be provided to at least one of the upper and lower chamber units 210 and 220 and may evacuate the sealed interior space defined by the upper and lower chamber units 210 and 220 joined together. In one aspect of the present invention, the vacuum pumping means 610, 621, and 622 may, for example, include a high vacuum pump (Turbo Molecular Pump, "TMP") 610 and a first and second low vacuum pump (Dry-Pump) 621 and 622, respectively.

The first low vacuum pump 621 may be connected to a high vacuum chamber pipeline 630 provided at a central region of the upper chamber unit 210 and enable the high vacuum pump 610 and the interior spaces defined by the upper and lower chamber plates 212 and 222 to be in communication with each other. Moreover, the first low vacuum pump may evacuate the sealed interior space, definable by the upper and lower chamber units 210 and 220 to a predetermined pressure.

The second low vacuum pump 622 may be connected to low vacuum chamber pipelines 641 and 642 passing through side regions of the upper and lower chamber units 210 and 220. Further, the second low vacuum pump 622 may be connected to pipelines in the upper and lower stages 230 and 240 and to a substrate securing pipeline 650 connected to the vacuum pipelines 271 and 272 in the stages 230 and 240, respectively, for securing the substrates using a suction force. The pipelines 630, 641, 642, and 650 may include at least one shut off valve 661, 662, 663, 664, 665, 666, 667, 668, and 669. The high pressure vacuum pipeline 630 may include a pressure sensor 670 for measuring a pressure inside of the interior spaces the substrates are held therein.

In one aspect of the present invention, the first and second low vacuum pumps 621 and 622 may be used to evacuate the interior spaces of the upper and lower low vacuum chamber units 410 and 420, respectively.

The low vacuum chamber pipelines 641 and 642 and the substrate securing pipeline 650, in communication with the second low vacuum pump 622, may be used as pipelines for venting. Accordingly, gas (e.g., $N_2$ gas) may be injected into the sealed interior space definable by the upper and lower chamber units 210 and 220 for returning a pressure therein from a vacuum state to an atmospheric pressure.

FIG. 7 illustrates a perspective view of support means within the substrate bonding device in accordance with the principles of the present invention.

Figure 21:
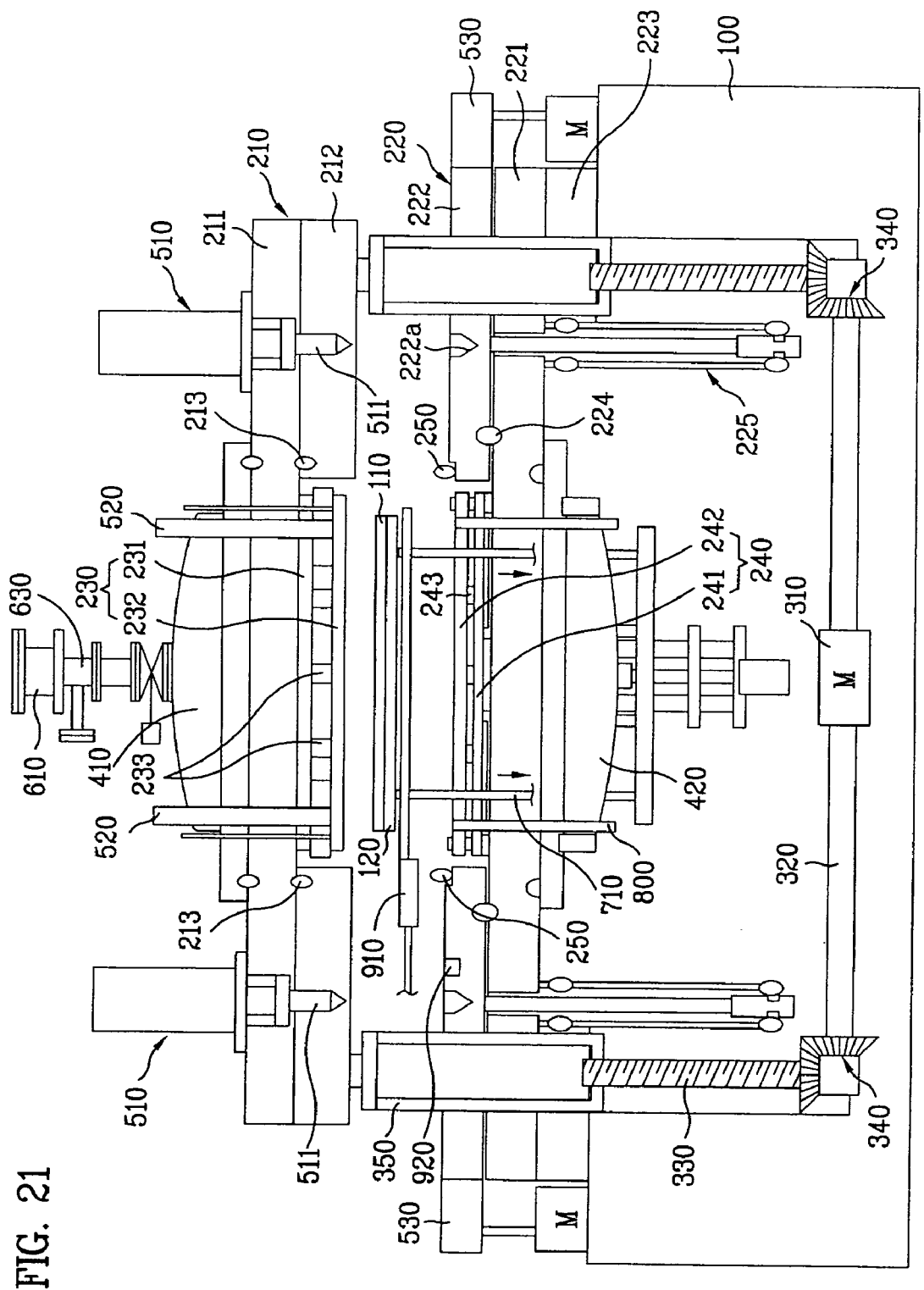

Referring to FIGS. 3 and 7, the support means may, for example, include a lift pin 710 and a plurality of actuators 720. In one aspect of the present invention, the lift pin 710 may have a thickness sufficient to support at least one substrate while substantially preventing the at least one substrate from sagging. A central region of the lift pin 710 may include a downwardly bent portion for allowing a loader 910 to support the at least one substrate without interfering with the lift pin 710 (see, for example, FIG. 12). Moreover, portions of the lift pin 710 may be raised through the lower stage 240 and above the upper surface of the lower stage 240 to facilitate the safe seating of the substrate 120 as it is loaded onto the lower stage 240 (see, for example FIG. 12). In one aspect of the present invention, when a substrate is not loaded onto the lower stage 240, a top surface of the lift pin 710 may be positioned below the top surface of the lower stage 240. In another aspect of the present invention, a plurality of actuators 720 may raise and lower the lift pin 710 as required. Accordingly, the support means may facilitate the unloading of the bonded and unbonded substrates seated on the lower stage 240 (see, for example FIG. 21).

Referring back to FIG. 3, and in accordance with the principles of the present invention, the photosetting means

800 may be mounted through at least one of the upper and lower chamber units 210 and 220, respectively, to partially harden sealant material coated onto predetermined regions of the loaded substrates, secured by their respective stages 230 and 240. In one aspect of the present invention, the photosetting means 800 may, for example, include a UV directing part for directing UV light to the sealant material.

Still referring to FIG. 3, a gap determining sensor 920 may be arranged on a surface of the lower chamber plate 222 of the lower chamber unit 220 for determining a distance between the upper and lower chamber units 210 and 220, respectively, and for determining an error in a movement of the upper chamber unit 210 prior to bonding of the substrates 110 and 120.

A method for fabricating an LCD device using the substrate bonding device shown in FIGS. 3 to 7 will now be described in greater detail with reference to FIGS. 8 to 22.

Figure 22:
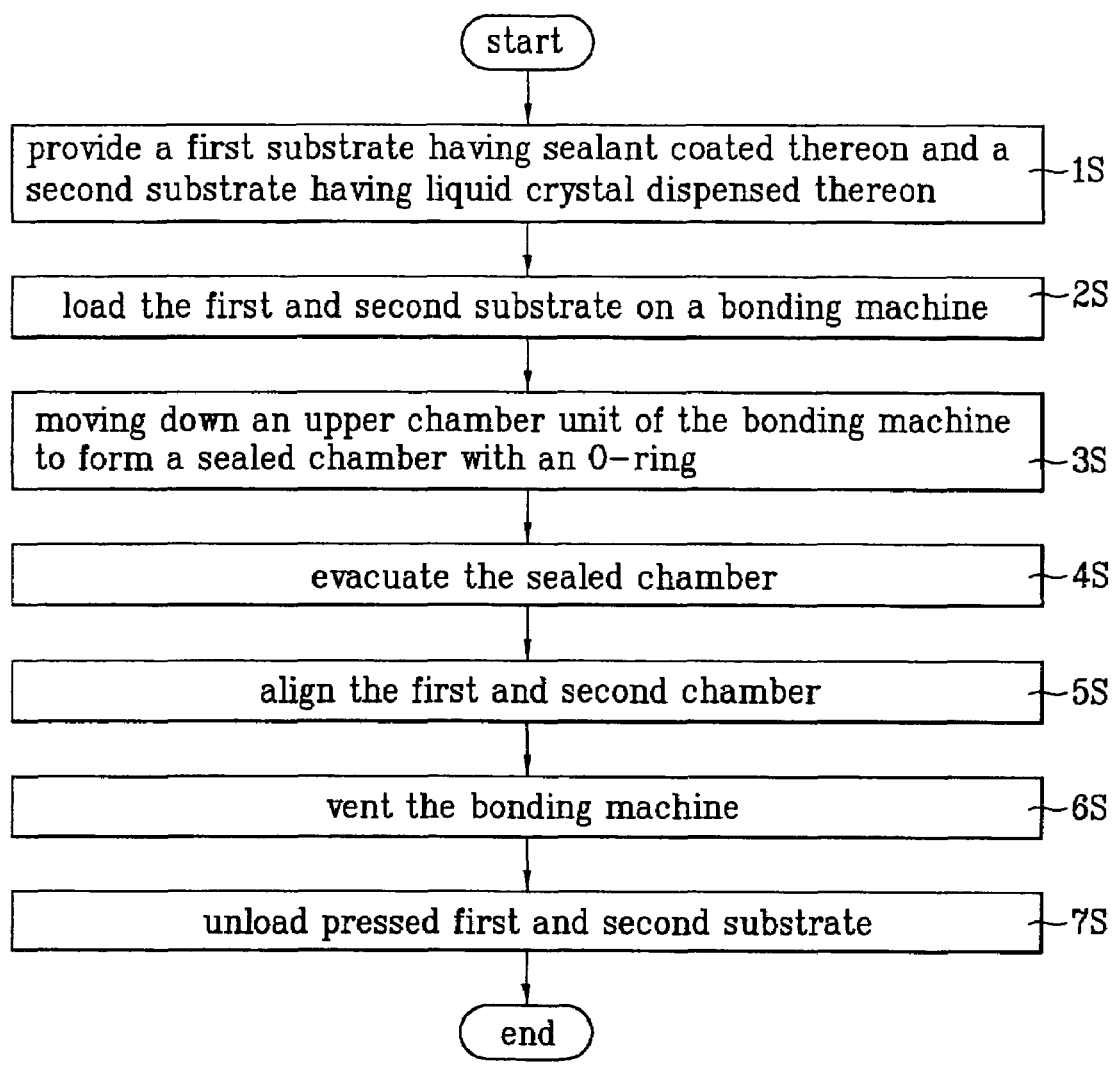
FIG. 22 illustrates a flow chart of a method for fabricating an LCD panel in accordance with the principles of the present invention.

FIG. 22 illustrates a flow chart of a method for fabricating an LCD device in accordance with the principles of the present invention.

Referring to FIG. 22, a first substrate 110, coated with sealant material, and a second substrate 120, having liquid crystal dispensed thereon, may be provided from different fabrication lines (Step 1S). In one aspect of the present invention, the first substrate 110 may be provided as one of a TFT array substrate or a color filter array substrate while the second substrate 120 may be provided as the other of the TFT array substrate or the color filter array substrate. In another aspect of the present invention, the sealant may be provided as a thermosetting sealant, a UV setting sealant, a combination UV/thermosetting sealant, etc. In yet another aspect of the present invention, the second substrate may be coated with the sealant material and may also have liquid crystal material dispensed thereon.

After the first and second substrates 110 and 120, respectively, are provided, they may be loaded into the substrate bonding device (Step 2S). Accordingly, and while referring to FIG. 8, the first substrate 110 may be brought into a space between the upper and lower chamber units 210 and 220, respectively, via a loader 910. In one aspect of the present invention, the first substrate 110 may be coated with the sealant material (not shown). Accordingly, the surface of the first substrate 110 contacting the sealant material may face downwardly, towards the lower chamber unit 220. In anther aspect of the present invention, the first substrate 110 may not be coated with the sealant material (i.e., the second substrate 120 coated with the sealant and has the liquid crystal material dispensed thereon). Accordingly, the surface of the first substrate 110 on which a common electrode, color filter layer, black matrix layer, etc., is formed may face downwardly, towards the lower chamber unit 210.

Figure 9:
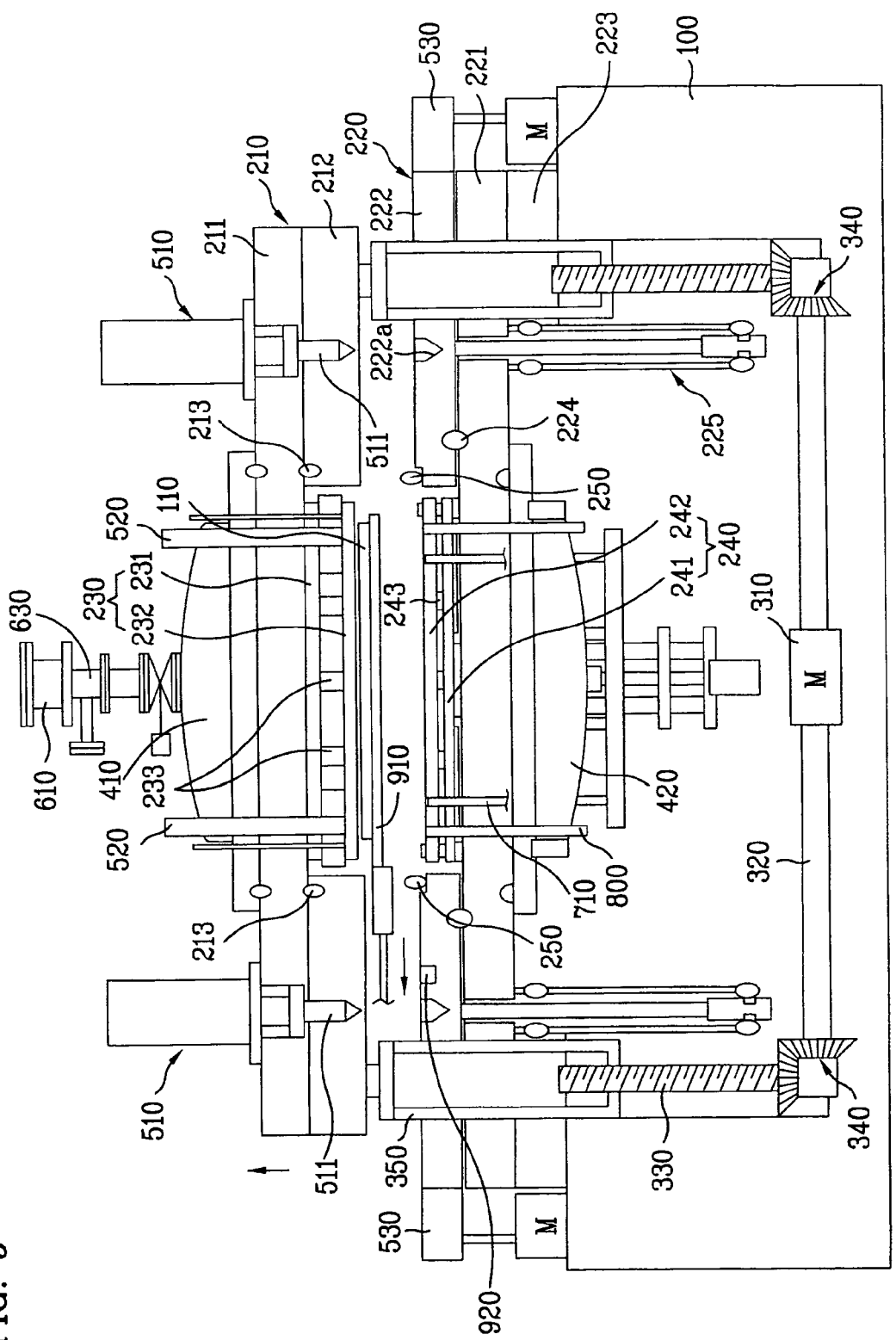
FIGS. 9 and 10 illustrate the securing of a first substrate to an upper stage within the substrate bonding device in accordance with the principles of the present invention.

Next, and while referring to FIG. 9, the upper chamber unit 210 may be lowered from its original position such that the upper stage 230 is arranged proximate the first substrate 110. The first substrate 110 may then become secured to the upper stage 230 by a suction force generated by the second low vacuum pump 622 and by an electrostatic charge (ESC) generated by the securing plate 232. In one aspect of the present invention, the first substrate 110 may be secured to the upper stage 230 by simultaneously applying the suction force and the electrostatic charge. In another aspect of the present invention, the first substrate 110 may be secured to the upper stage 230 by applying the suction force either before or after the electrostatic charge is applied. However, if the electrostatic charge is applied first, sparks may be generated between the substrate 110 and the securing plate 232. Accordingly, it may be beneficial to secure the first substrate 110 to the upper stage 230 by applying the suction force first, followed by the application of the electrostatic charge.

Figure 10:
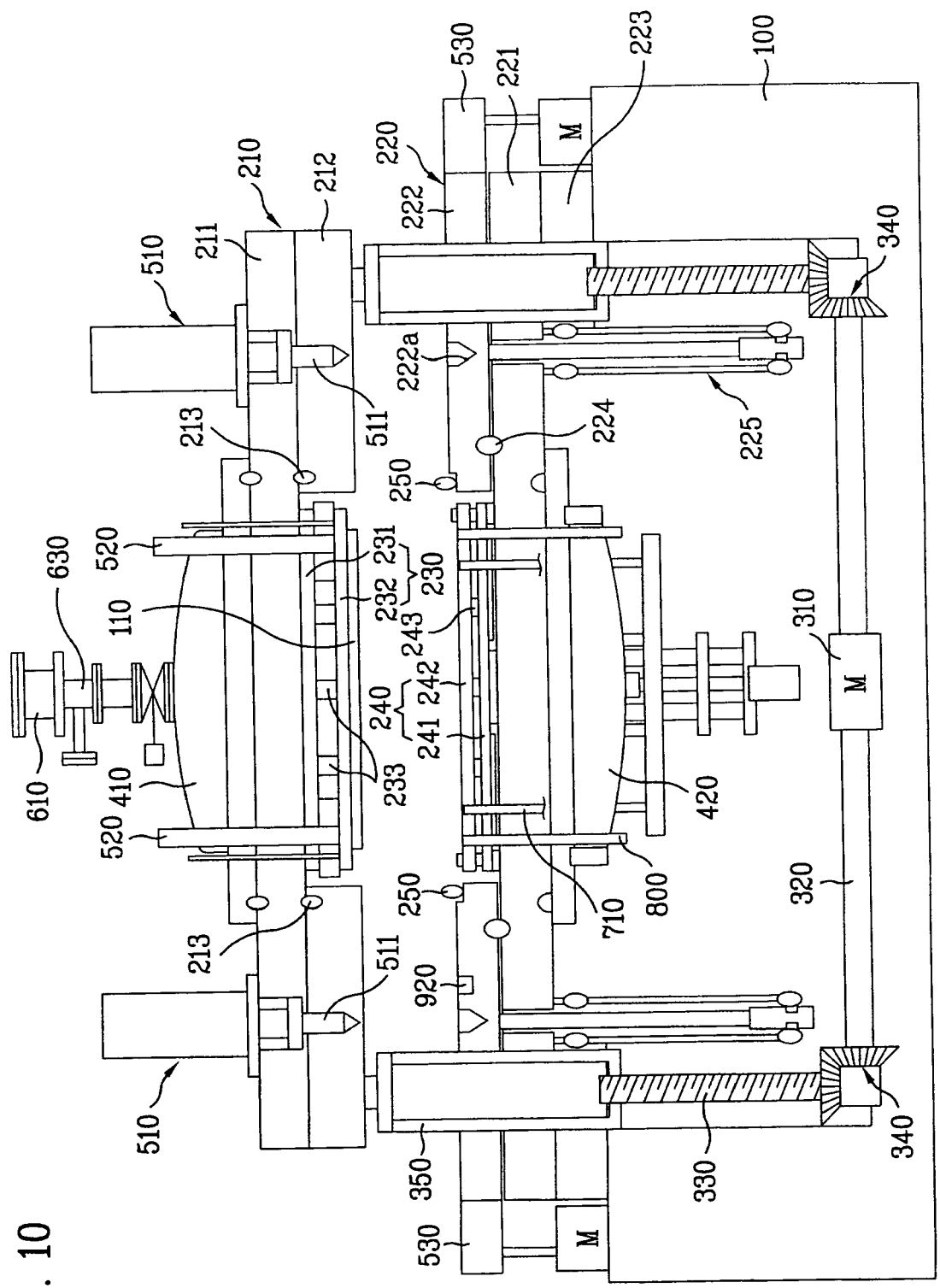

Referring now to FIG. 10, after the first substrate 110 has been secured to the upper stage 230, the upper chamber unit 210 may be raised to its original position and the loader 910 may be removed from the substrate bonding device.

Figure 11:
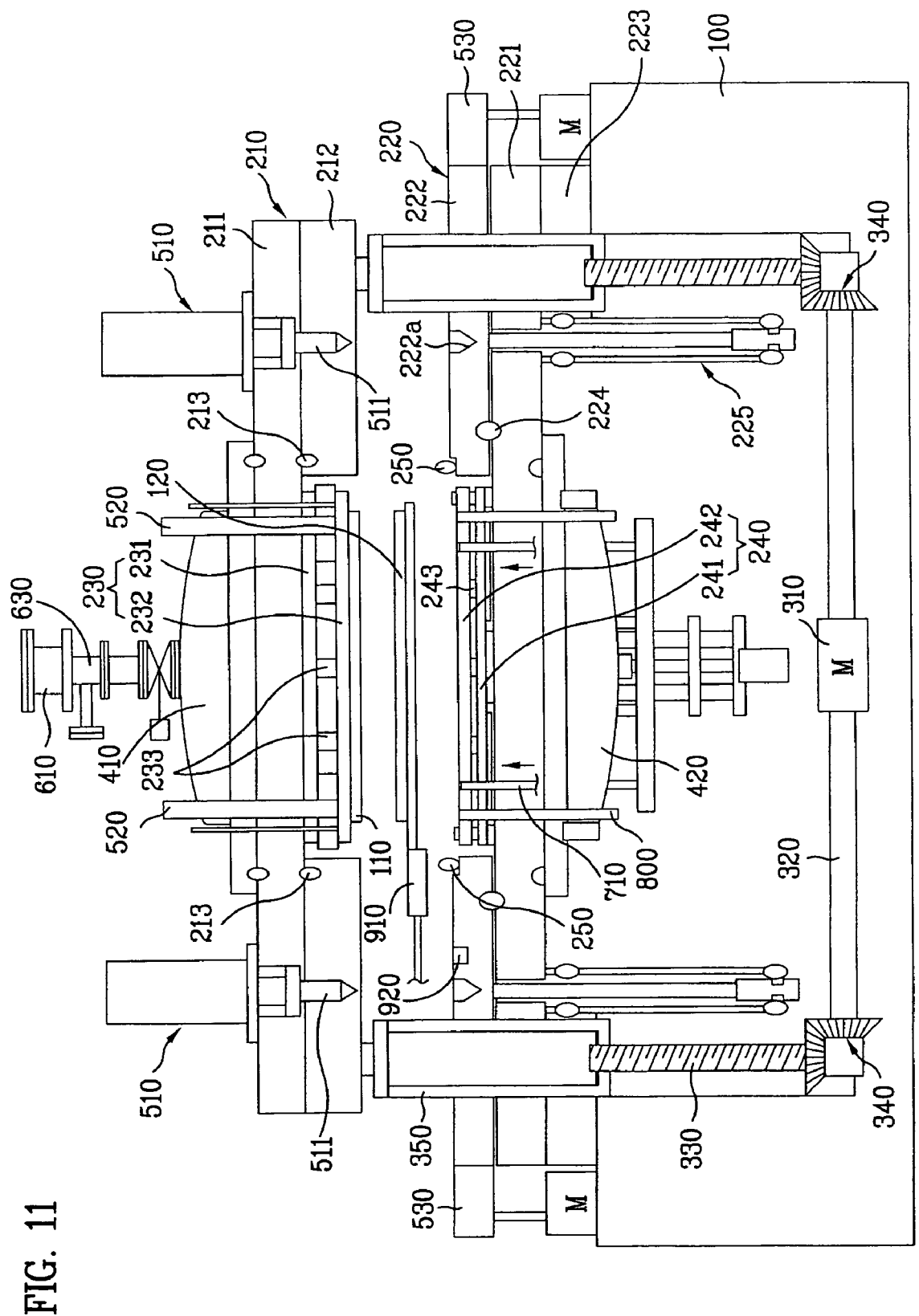
FIGS. 11 to 13 illustrate the loading of a second substrate and the securing of the second substrate to a lower stage within the substrate bonding device in accordance with the principles of the present invention.
Figure 12:
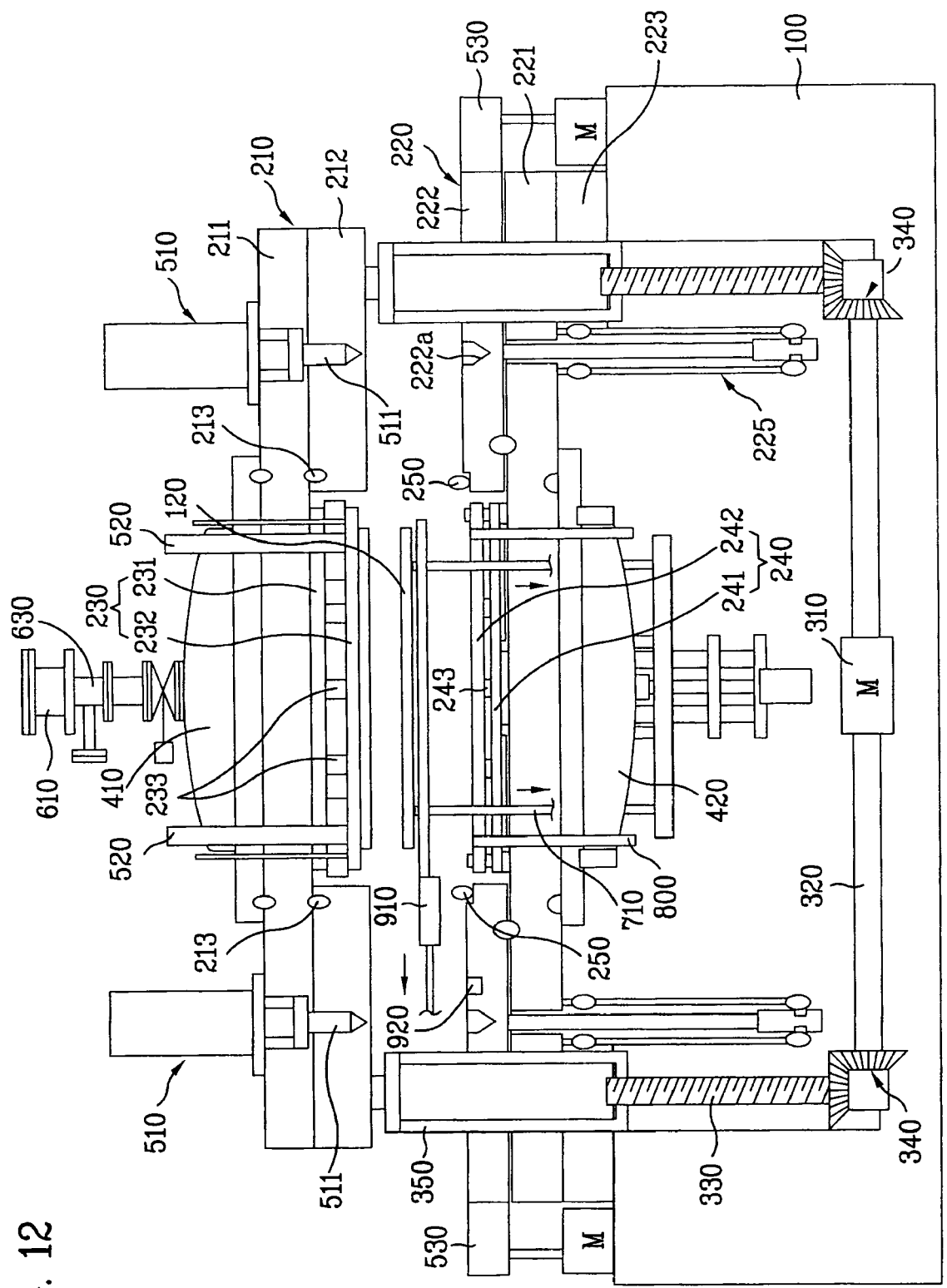

Next, and with reference to FIG. 11, the loader 910 may be reinserted into the substrate bonding device while supporting the second substrate 120. In one aspect of the present invention, liquid crystal material (not shown) may be dispensed onto the second substrate 120. In another aspect of the present invention, the second substrate 120 may be coated with the sealant material and may have the liquid crystal material dispensed thereon. In either aspect of the present invention, however, the surface of the second substrate 120 contacting the sealant material and/or the liquid crystal material may face upwardly, towards the upper chamber unit 210. Upon loading the second substrate 120 into the substrate bonding device, the lift pin 710 may be raised from its original position, through the lower stage 230 and from below the upper surface of the lower stage 230, to push the second substrate 120 away from the loader 910. Accordingly, the lift pin 710 may support the second substrate 210 at a predetermined height above the loader 910 (as shown in FIG. 12). When the second substrate 120 is supported at the predetermined height, the loader 910 may be removed from the substrate bonding device.

Figure 13:
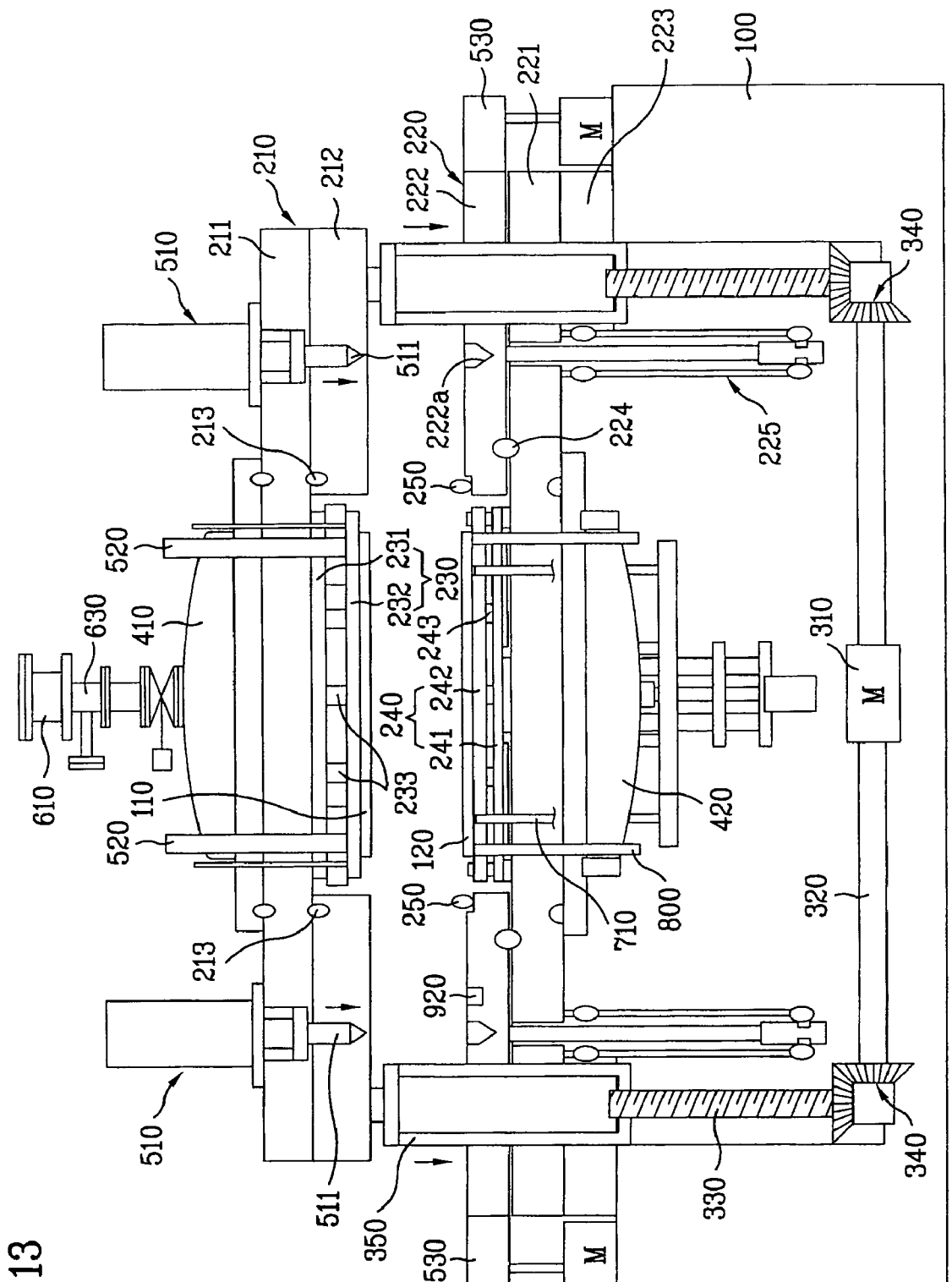

Next, as shown in FIG. 13, the lift pin 710 may be lowered such that the second substrate 120 rests on, and is supported by the lower stage 240. When the second substrate 120 is supported by the lower stage 240, the second substrate 120 may be secured to the lower stage 240 using suction forces and electrostatic charges. When the first and second substrates 110 and 120 are secured to their respective stages 230 and 240, loading of the substrate bonding device is complete.

Figure 14:
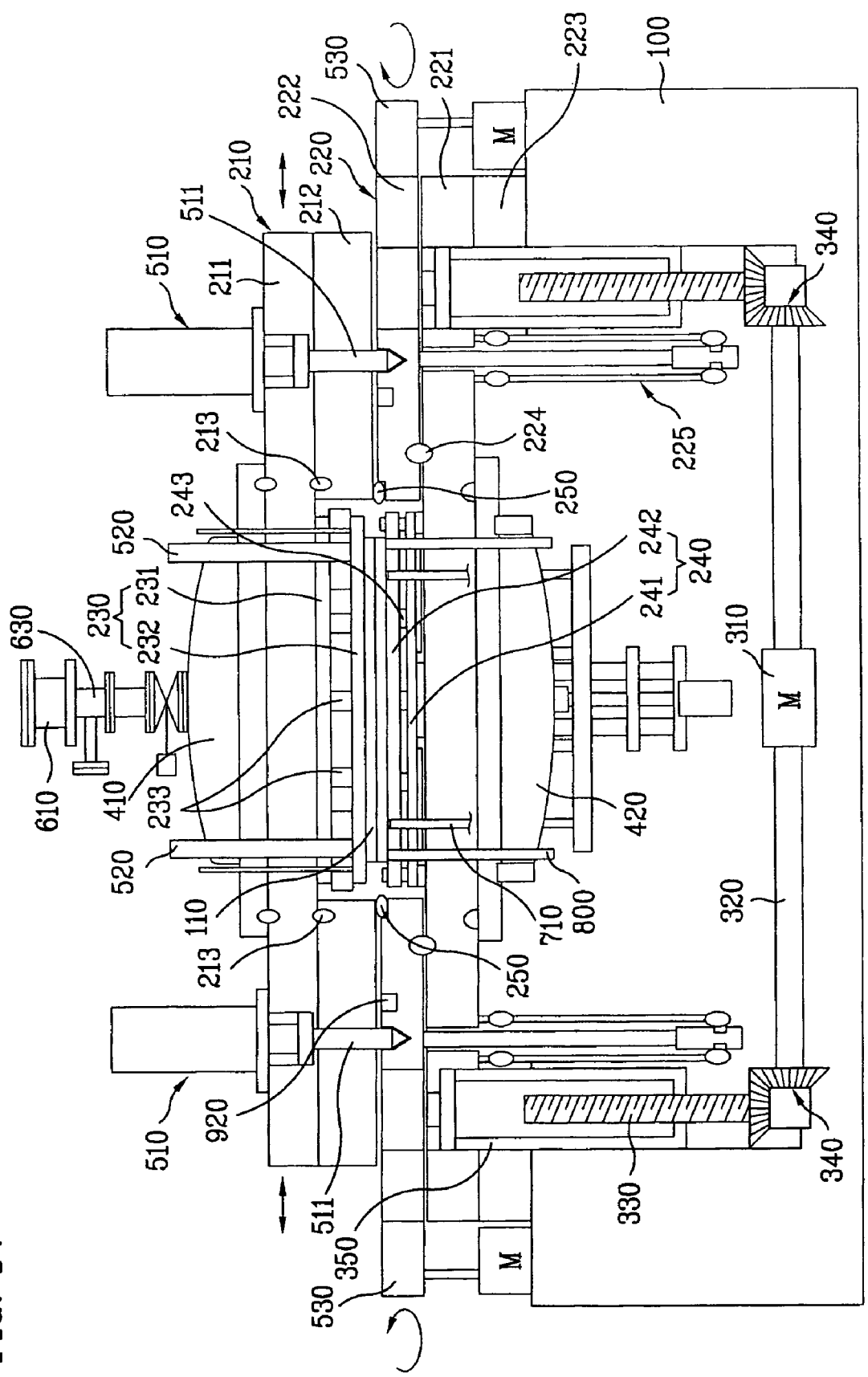
FIGS. 14 and 15 illustrate a bonding of the substrates within the substrate bonding device in accordance with the principles of the present invention.

Referring to now FIG. 14, after loading of the substrate bonding device is complete, the driving motor 310 of the chamber moving means may rotate the driving shafts 320 and the connecting shafts 330 to lower the jack parts 350 from their original positions. In one aspect of the present invention, the upper chamber unit 210 is lowered as the jack parts 350 are lowered from their original positions. Further, the linear actuators 510 may lower the plurality of movable shafts 511 such that the moveable shafts 511 project to a predetermined height from the bottom surface of the upper chamber plate 212. As a result of the lowering of the upper chamber unit 210 and of the projection of the moveable shafts 511, the end portions of the moveable shafts 511 may be received within, and contact interior surfaces of respective ones of the holes 222a formed in the lower chamber plate 222. In the event that, for example, the upper chamber unit 210 is not substantially level with respect to the lower chamber unit 220, the movable shafts 511 may contact the interior surfaces of the holes 222a in succession. As the end portions of the moveable shafts 511 are received within the holes 222a, the chamber moving means moves the upper chamber unit 210 downwardly such that a bottom surface of the upper chamber plate 212 contacts a top surface of the third sealing member 250, fitted to a periphery of the lower chamber plate 222. As the jack parts 350 are lowered further, they move out from between the upper chamber unit 210 the lower chamber unit 220 such that a sealed interior space, defined by the upper and lower chamber units 210 and 220 is created, wherein the sealed interior space is substantially sealed from the external environment due to the weight of the upper chamber unit 210 pressing upon the third seal member 250. Therefore, the first and second substrates 110 and 120 may be substantially isolated from the external environment (Step 3S).

According to the principles of the present invention, the first and second substrates 110 and 120, held at their respective stages 230 and 240, may be slightly compressed due to the weight of upper chamber unit 210 and due to the pressure in the sealed interior space. After the sealed interior space is created, the first and second substrates 110 and 120 may be partially bonded to each other. By partially bonding, the relative positions of the first and second substrates 110 and 120 may be adjusted. In one aspect of the present invention, the distance between the upper chamber unit 210 and the lower chamber unit 220 (and therefore the gap between the substrates) may be determined by the gap determining sensor 920.

Once created, the sealed interior space defined by the upper and lower chamber units 210 and 220 is evacuated (Step 4S). Accordingly, the first and second low vacuum pumps 621 and 622 may be activated to evacuate the sealed interior space to a first pressure, measured by the pressure sensor 670. After it is determined that the first and second low vacuum pumps 621 and 622 have evacuated the interior space to the first pressure, the high vacuum pump 610 may be activated to substantially evacuate the interior space.

In one aspect of the present invention, the high and first low vacuum pumps 610 and 621 may be connected to the same pipeline 630. Therefore, the first low vacuum pump 621 may be deactivated when the high vacuum pump 610 is activated. After the interior space is substantially evacuated, the first and second substrates 110 and 120, arranged within the evacuated, sealed interior space may be aligned by the alignment means (Step 5S).

FIGS. 23A to 23C illustrate rough alignment marks used in an aligning method in accordance with the principles of the present invention. FIGS. 24A to 24C illustrate fine alignment marks used in an aligning method in accordance with the principles of the present invention. FIG. 25 illustrates a focusing position of a camera during an aligning method in accordance with the principles of the present invention.

Upon aligning the first and second substrates 110 and 120, the alignment cameras 520 (as shown in FIGS. 3 to 21) may view alignment marks formed on the first and second substrates 110 and 120, determine a deviation in alignment between the substrates 110 and 120, determine a distance required for the upper stage 230 to move referencing to the deviation, calculate and rotate the cams 530 a predetermined amount, and move the lower chamber plate 222.

According to the principles of the present invention, the lower chamber plate 222 may be coupled to the upper chamber unit 210 via the linear actuators 510. Further, the lower chamber plate 222 may be spaced a predetermined distance from the lower base 221 in accordance with the support part 225. Therefore, the upper chamber unit 210 may move substantially with the movement of the lower chamber plate 222, moving along a direction determined by the rotation of the cams 530. Moreover, since the lower chamber plate 222 is separated from the lower stage 240 (e.g., capable of moving independently of the lower stage 240) the first and second substrates 110 and 120, held by their respective stages 230 and 240, may be smoothly positioned and aligned by moving only the upper stage 230.

In one aspect of the present invention, the first and second substrates may be aligned by aligning alignment marks formed on the substrates. In another aspect of the present invention, the alignment marks may be provided as rough alignment marks and fine alignment marks. In one aspect of the present invention, the rough and fine alignment marks may be formed by carving predetermined regions of the substrates. Accordingly, an alignment process may, for example, be carried out by performing a rough alignment process using the rough alignment marks followed by performing a fine alignment process using the fine alignment marks.

Figure 23:
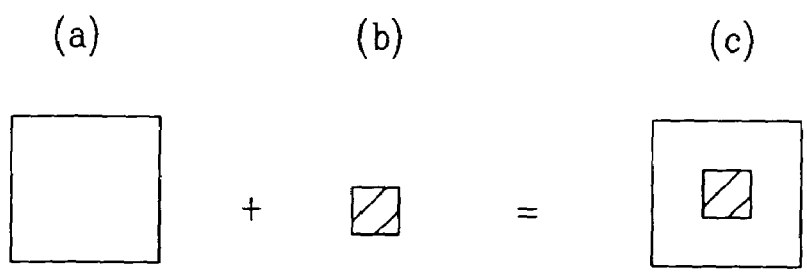
FIGS. 23A to 23C illustrate rough alignment marks used in an aligning method in accordance with the principles of the present invention.
Figure 24:
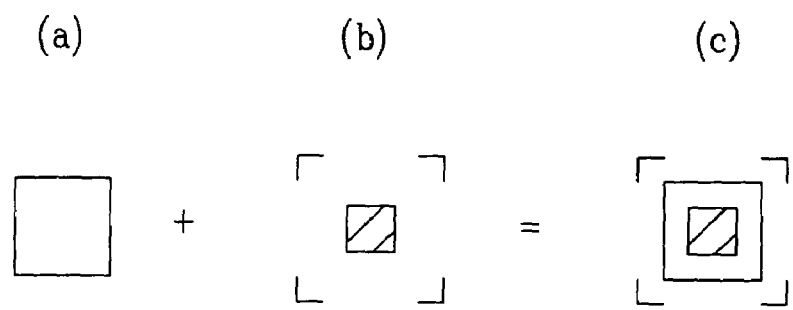
FIGS. 24A to 24C illustrate fine alignment marks used in an aligning method in accordance with the principles of the present invention.
Figure 25:
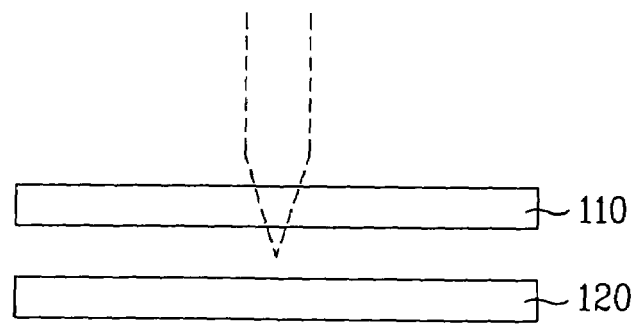
FIG. 25 illustrates a focusing position of a camera during an aligning method in accordance with the principles of the present invention.

Referring, for example, to FIGS. 23 and 24, the first substrate 110 and the second substrate 120 may each be formed with a plurality of rough alignment marks having a size of approximately 3 μm size (see FIG. 23) and a plurality of fine alignment marks having a size of approximately 0.3 μm size (see FIG. 24). For example, the first substrate 110 may include rough alignment marks as shown in FIG. 23A and fine alignment marks as shown in FIG. 24A while the second substrate 120 may include rough alignment marks as shown in FIG. 23B and fine alignment marks as shown in FIG. 24B.

In one aspect of the present invention, separate alignment cameras may be used to align the rough alignment marks and fine alignment marks and may be provided within the substrate bonding device of the present invention. The alignment cameras may be provided rough and fine alignment cameras because aligning rough and fine alignment marks using a single camera may be difficult. For example, difficulties may arise due to differences in size between the rough and fine alignment marks in addition to the fact that the rough and fine alignment marks are often formed in different regions of the substrate.

Accordingly, upon aligning the first and second substrates, the upper stage 230 may be lowered such that the first substrate 110 is separated by the second substrate 120 in a manner sufficient to prevent the sealant on the first substrate 110 from contacting the liquid crystal material on the second substrate 120. For example, the first substrate 110 may be separated from the second substrate 120 by a distance of approximately 300 μm.

Next, the first and second substrates 110 and 120 may be aligned by moving the upper stage 230 along a lateral direction. By moving the upper stage 230, the rough alignment mark formed in the second substrate 120 (as shown in FIG. 23B) may be substantially aligned with (e.g., precisely positioned within) the rough alignment mark formed in the first substrate 110 (as shown in FIG. 23A) in such a manner as shown in FIG. 23C. In one aspect of the present invention, the rough alignment marks may be aligned using alignment cameras 520 provided at at least two diagonally opposed regions of the first and second substrates 110 and 120. In another aspect of the present invention, the rough alignment marks may be aligned by first focusing the alignment cameras on the rough alignment mark formed in the first substrate 110 and focusing secondly on the rough alignment mark formed in the second substrate. In yet another aspect of the present invention, and with reference to FIG. 25, the rough alignment marks may be aligned by focusing the alignment cameras on an intermediate point between the first substrate 110 and the second substrate 120.

After the rough alignment marks have been substantially aligned, the fine alignment marks may be aligned by further lowering the upper stage 230 and by moving the upper stage 230 along a lateral direction. By moving the upper stage 230, the fine alignment marks formed in the second substrate 120 (shown in FIG. 24B) may be substantially aligned with (e.g., precisely positioned within) the fine alignment marks formed in the first substrate 110 (shown in FIG. 24A) in such a manner as shown in FIG. 24C. In one aspect of the present invention, the fine alignment marks may be aligned using alignment cameras 520 provided at the four corner regions of the first and second substrates 110 and 120.

According to the principles of the present invention, the distance between the first and second substrate 110 and 120 may be varied at least three times during alignment of the fine alignment marks. For example, in a first fine alignment mark alignment step, the upper stage 230 may spaced apart from the second substrate 120 by a distance sufficient to prevent the sealant on the first substrate 110 from contacting the liquid crystal material on the second substrate 120 (e.g., wherein the first substrate is separated from the second substrate by a distance of approximately 300 μm). In a second fine alignment mark alignment step, the upper stage 230 may be lowered such that the distance between the first and second substrates 110 and 120 may be approximately 150 μm. Accordingly, during the second fine alignment mark alignment step, central portions of the first and second substrates 110 and 120 may contact each other due to a sagging of the substrates. In a third fine alignment mark alignment step, the upper stage 230 may be further lowered such that the distance between the first and second substrates 110 and 120 is approximately 100 μm.

Accordingly, the fine alignment marks may be aligned in a three step process. Therefore, and in one aspect of the present invention, the alignment of the fine alignment marks may be determined and corrected during each fine alignment mark alignment step. It should be noted, however, that the fine alignment marks may be aligned via the first fine alignment mark alignment step only, while omitting the second and third fine alignment mark alignment steps. Further, during the second and third fine alignment mark alignment steps, substantially no damage may result from contact between the substrates and the sealant or liquid crystal material because the fine alignment marks were sufficiently aligned during the first fine alignment mark alignment step.

In one aspect of the present invention, the fine alignment marks may be aligned using alignment cameras provided within the upper chamber unit 210 and/or the lower chamber unit 220, arranged at diagonally opposed regions of the first and second substrates 110 and 120. In one aspect of the present invention, and with reference to FIG. 25, the fine alignment cameras may be aligned by focusing the alignment cameras on an intermediate point between the second substrate 120 and the first substrate 110 respectively. In another aspect of the present invention, the fine alignment marks may be aligned by first focusing the alignment cameras on the fine alignment marks formed in the second substrate 120 and focusing second on the fine alignment marks formed in the first substrate 110, or vise versa. By changing the focal distance of the alignment cameras as described above, the accuracy by which the fine alignment marks are aligned may be improved compared to focusing on the intermediate point between the two substrates.

According to the principles of the present invention, at least two rough alignment marks and at least two fine alignment marks may be formed on both the first substrate 110 and the second substrate 120. It will be appreciated, however, that accuracy with which the two substrates are aligned may be improved by increasing the number of the alignment marks used. Accordingly, as the size of substrates to be bonded increases, more alignment marks may be used to maintain accurate alignment. In one aspect of the present invention, the rough and fine alignment marks may, for example, be formed within scribe regions between a plurality of panels formed within a substrate. In another aspect of the present invention, the rough and fine alignment marks may, for example, be formed at peripheral regions of the substrates, within which the plurality of panels are formed.

After the fine alignment marks have been aligned, a power applied to the upper stage 230 generating the electrostatic charge, may be turned off and the chamber moving means may be activated to raise the upper chamber unit 210 upward to a predetermined height. Accordingly, the first substrate 110, previously secured by the upper stage 230, may become separated from the upper stage 230 and remain bonded to the second substrate 120 secured by the lower stage 240.

In one aspect of the present invention, after the upper chamber unit 210 has been raised the predetermined distance, the sealed interior space defined by the upper and lower chamber plates 212 and 222 may remain substantially sealed from the external environment via the third seal member 250. After the upper chamber unit 210 has been raised the predetermined distance, the alignment cameras 520 may be used to determine the state of alignment of the fine alignment marks formed on the first and second substrates 110 and 120. If it is determined that the alignment of the fine alignment marks has been degraded to outside an acceptable tolerance alignment value, the position of the upper stage 230 may be adjusted using the cams 530. If, however, it is determined that the alignment of the fine alignment marks remains sufficient, the sealed interior space defined by the upper and lower chamber units may be vented (Step 6S).

According to the principles of the present invention, the venting may be performed in two steps. For example, a first venting step may include injecting a gas such as nitrogen ($N_2$) into the interior space via the vacuum pipelines 271 and 272 connected to the second low vacuum pump 622 and the vacuum holes 232a and 242a in the securing plates 232 and 242 of the upper and lower stages 230 and 240, respectively. Accordingly, the shut off valves 666, 667, and 668 shown in FIG. 6 may be opened such that the nitrogen gas may flow through the vacuum holes 232a and 242a and be injected into the interior space. Since the nitrogen gas is supplied through the vacuum holes 232a and 242a, the first and second substrates 110 and 120 may become bonded via the sealant, even if the two substrates were not previously bonded via sealant in the preceding processes. Next, the nitrogen gas may be injected into the sealed interior space via the low vacuum chamber pipelines 641, 642 and 650 to increase pressure of the sealed interior space to an atmospheric pressure.

Accordingly, the substrates 110 and 120 may be bonded together via the sealant material while the sealed interior space, defined by the upper and lower chamber units, may be maintained in a vacuum state. After the substrates have been bonded together, the bonded substrates may be further compressed due to a pressure difference between the pressure within the cell gap between the two bonded substrates and the pressure within the interior space, increased as a result of the venting.

In one aspect of the present invention, the venting may be carried out after the fine alignment marks have been substantially aligned, after the electrostatic charge is deactivated, and after the first and second substrates have been bonded together by the sealant. However, even if the venting is carried out before bonding of the two substrates is complete, substantially no defects in the bond are generated because the first venting step pressurizes the substrates against each other, thereby sealing the bond between the substrates and the sealant material.

According to one aspect of the present invention, UV light may be directed to the sealant material to partially harden and set the sealant prior to venting. Directing the UV light to the sealant material may substantially minimize the degree to which the first and second substrates 110 and 120 become misaligned as a result of the venting. Accordingly, the UV light may be directed to the sealant material after the fine alignment marks have been aligned. According to another aspect of the present invention, the UV light may be directed to the sealant material after the venting to substantially minimize the degree to which the bonded substrates become misaligned from external impacts sustained while being transported to a subsequent processing station. Therefore, and in accordance with the principles of the present invention, the UV light may be directed to the sealant material either before the venting, after the venting, or both before and after the venting.

In one aspect of the present invention, the sealant material to which the UV light is directed to may include a dummy sealant pattern to substantially minimize possible misalignment caused by the venting or the transporting. Accordingly, the dummy sealant pattern may be provided to protect a main sealant, wherein the main sealant pattern may retain liquid crystal material within an LCD panel and wherein both the dummy and main sealant patterns may bond the first and second substrates 110 and 120 together. In another aspect of the present invention, the sealant material to which the UV light is directed to may include the main sealant pattern (e.g., if no dummy sealant pattern exists). In yet another aspect of the present invention, the UV light may be directed to the sealant material via the UV directing part 800, wherein UV light is may be directed to at least 10 regions (e.g., 14 regions) of the sealant material.

After venting the sealed interior space defined by the upper and lower chamber units, the bonded substrates may be unloaded (Step 7S) wherein, after the bonded substrates are unloaded, the aforementioned processes may be repeated to bond other substrates together.

Figure 15:
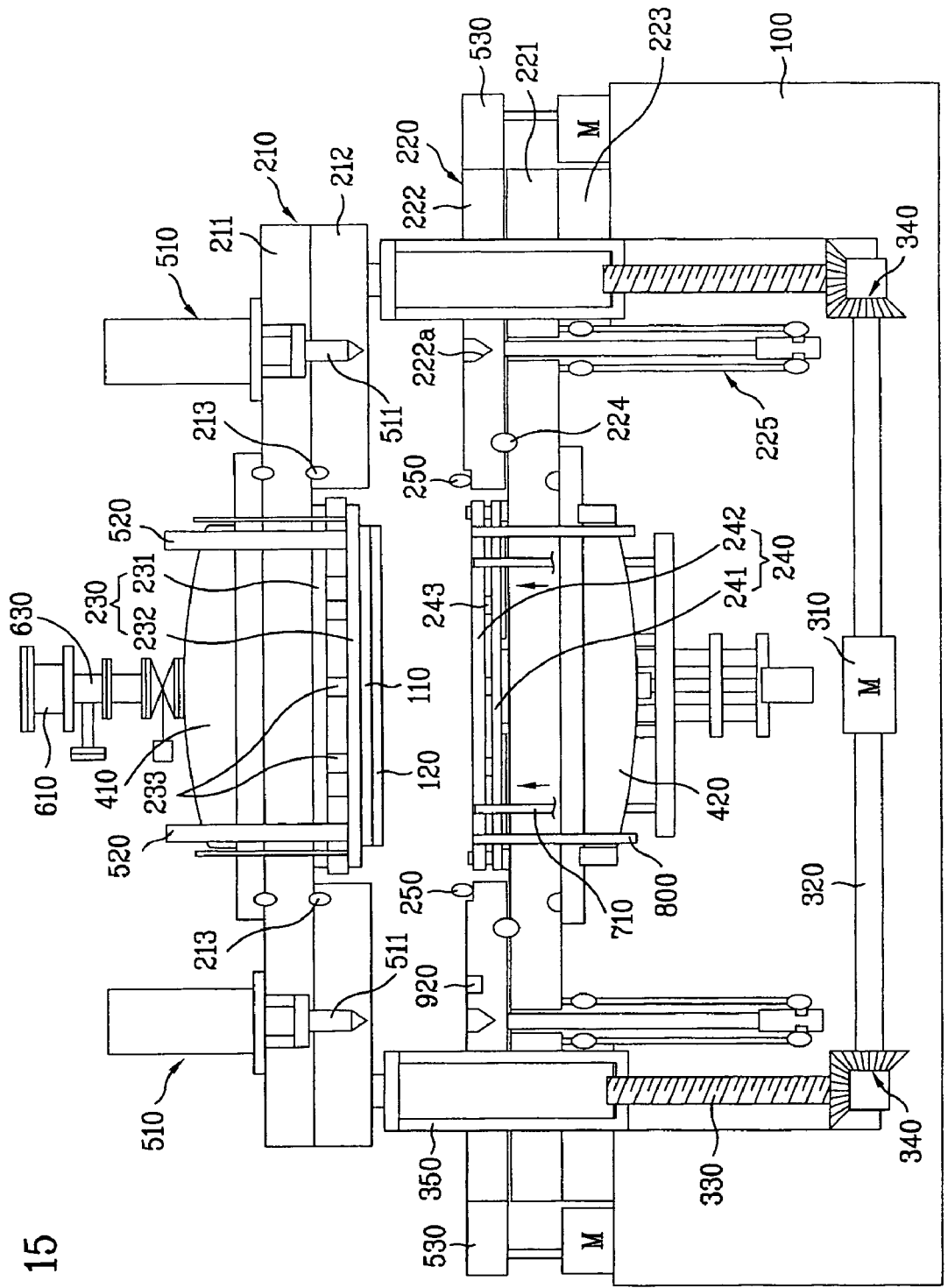
Figure 16:
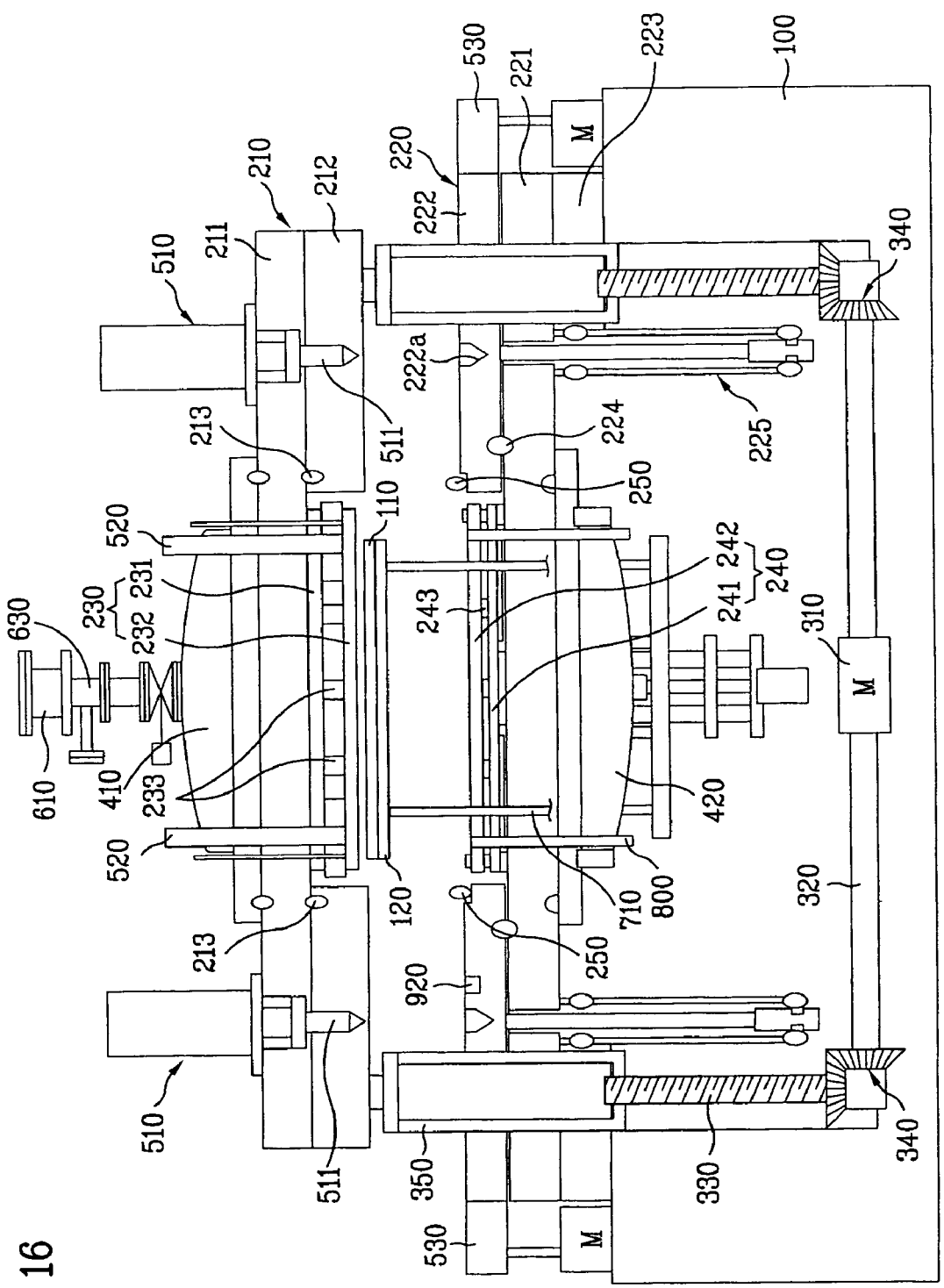
FIGS. 16 to 18 illustrate an unloading of the bonded substrates from within the substrate bonding device in accordance with one aspect of the present invention.
Figure 17:
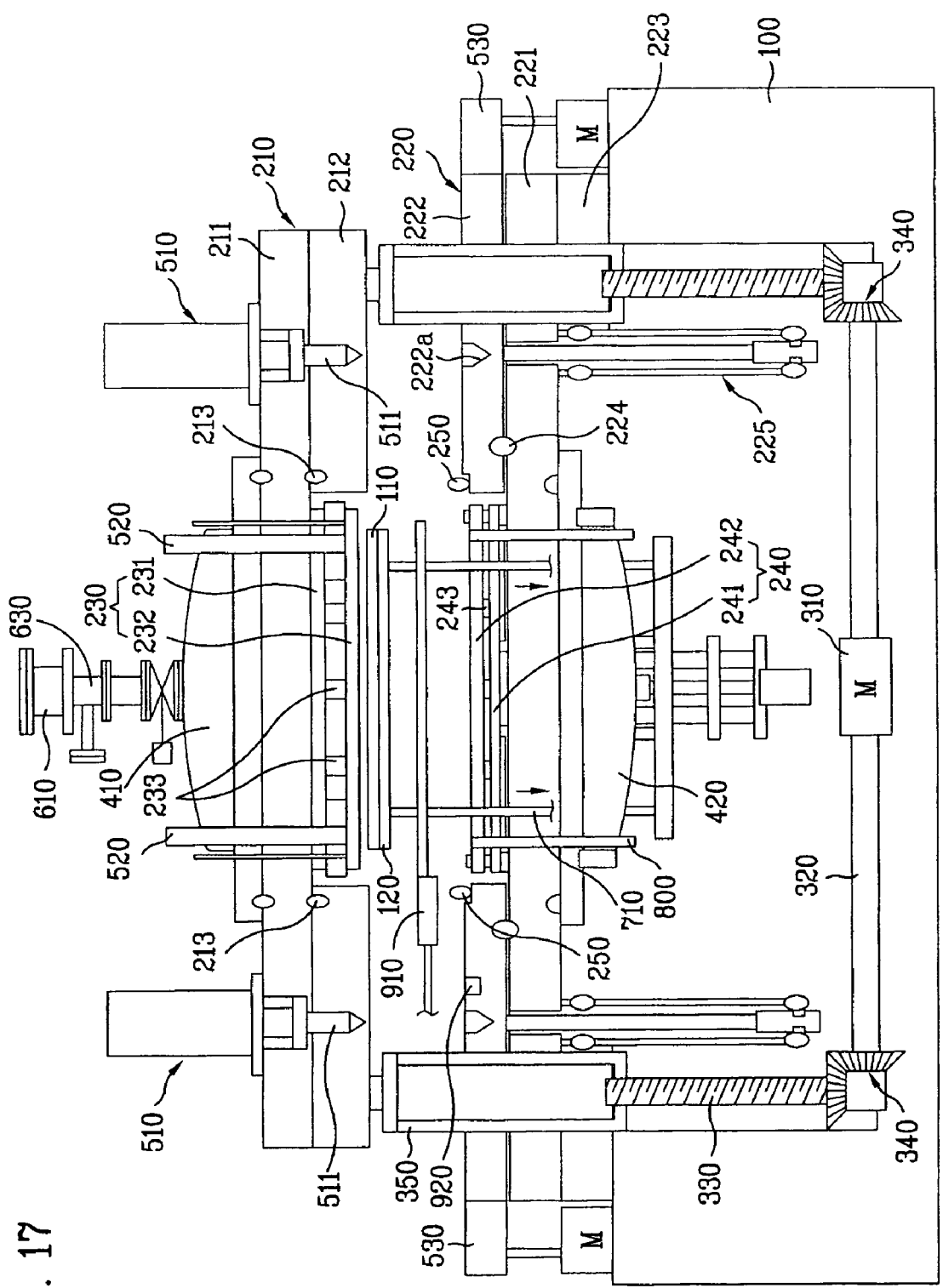
Figure 18:
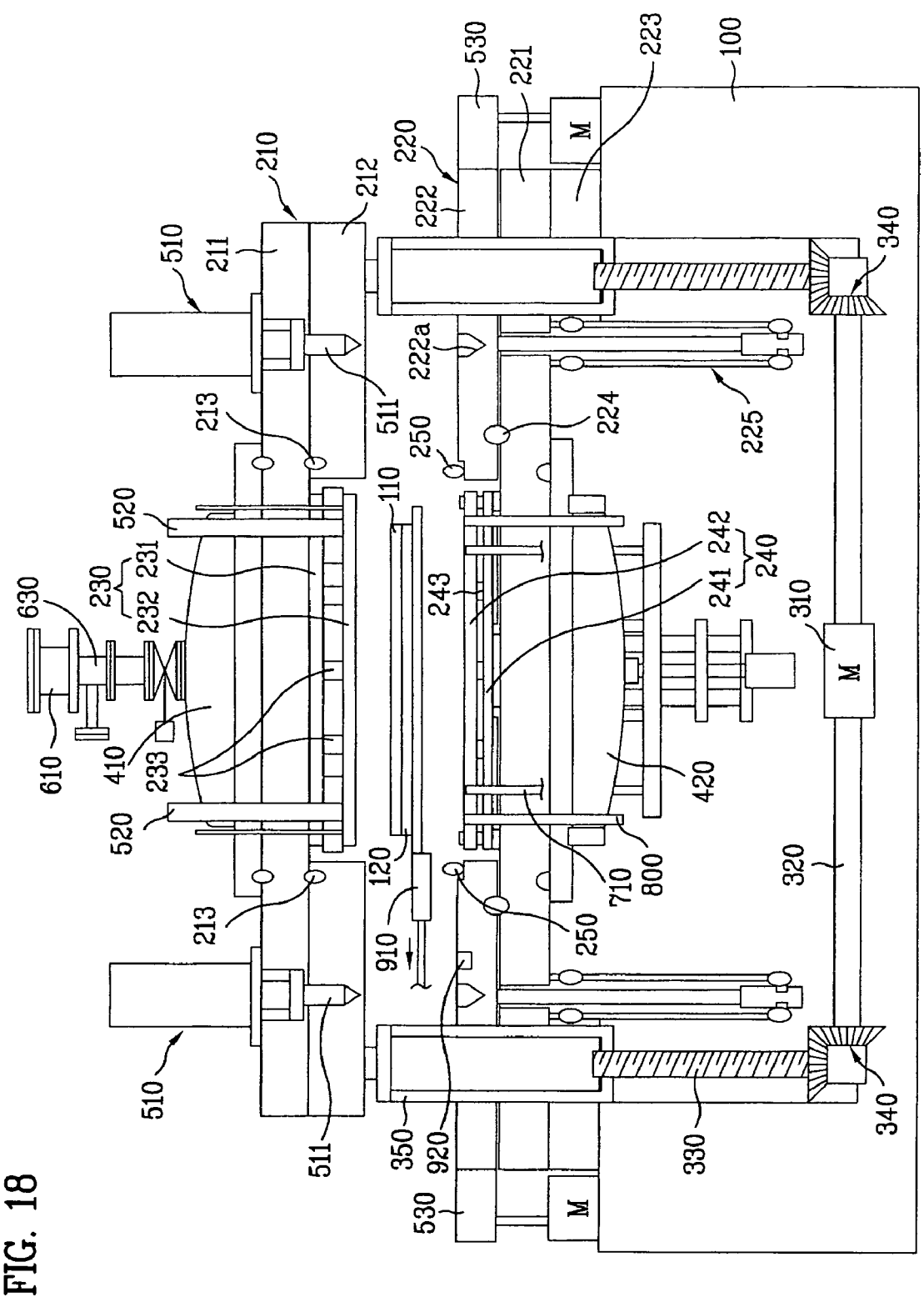

In one aspect of the present invention, and with reference to FIG. 15, the bonded substrates 110 and 120 may be unloaded from within the substrate bonding device by deactivating the electrostatic charge applied to the lower stage 240, securing the bonded substrates to the upper stage 230 by the suction force and by the electrostatic charge, raising the upper stage 230, with the bonded substrates secured thereto, a predetermined distance such that the bonded substrates do not interfere with a subsequently inserted loader 910. Referring to FIG. 16, the lift pin 710 of the support means may then be raised over the upper surface of the lower stage 240 proximate the bonded substrates 110 and 120, secured to the upper stage 230. Next, the suction force and the electrostatic charge applied by the upper stage 230 may be turned off wherein the bonded substrates may be released by the upper stage 230 and become supported by the top surface of the lift pin 710. Referring to FIG. 17, the loader 910 may be inserted into the substrate bonding device and may be arranged proximate a lower portion of the lift pin 710. Referring to FIG. 18, the lift pin 710 may then be moved down such that the bonded substrates 110 and 120 become supported by the loader 910. The loader 910 may then be removed from the substrate bonding device and to thereby complete unloading of the bonded substrates 110 and 120.

In another aspect of the present invention, the bonded substrates 110 and 120 may be unloaded by securing the bonded substrates 110 and 120 to the upper chamber unit 210, raising the upper chamber unit 210, inserting the loader 910 into the substrate bonding device proximate the secured bonded substrates, releasing bonded substrates such that the loader 910 supports the released bonded substrates, and removing the loader 910 supporting the bonded substrates from the substrate bonding device. Subsequently, the loader 910 may insert an unbonded first substrate 110 into the substrate bonding device where the unbonded first substrate may be secured by the upper chamber unit 210.

Figure 19:
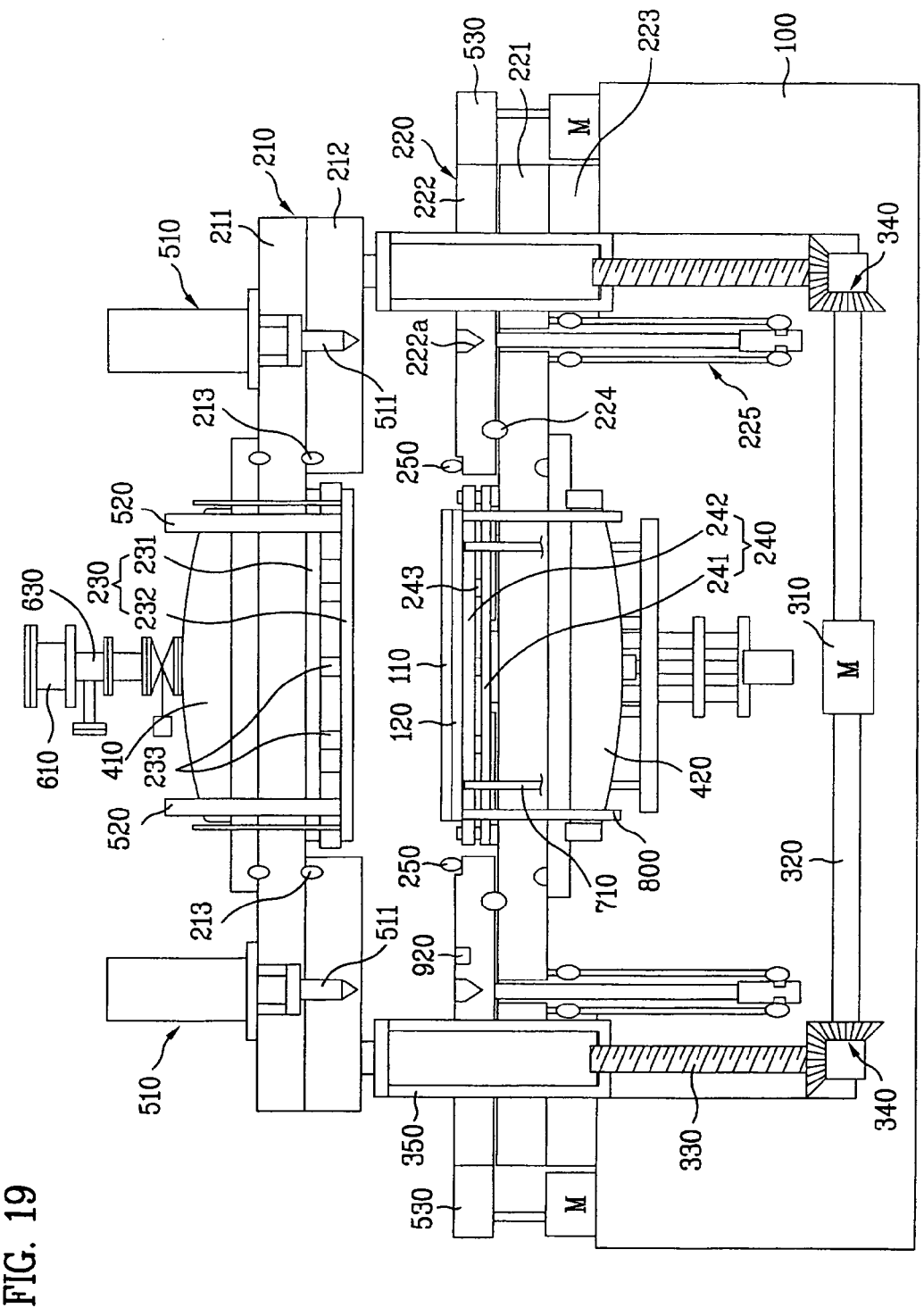
FIGS. 19 to 21 illustrate an unloading of the bonded substrates from within the substrate bonding device in accordance with another aspect of the present invention.
Figure 20:
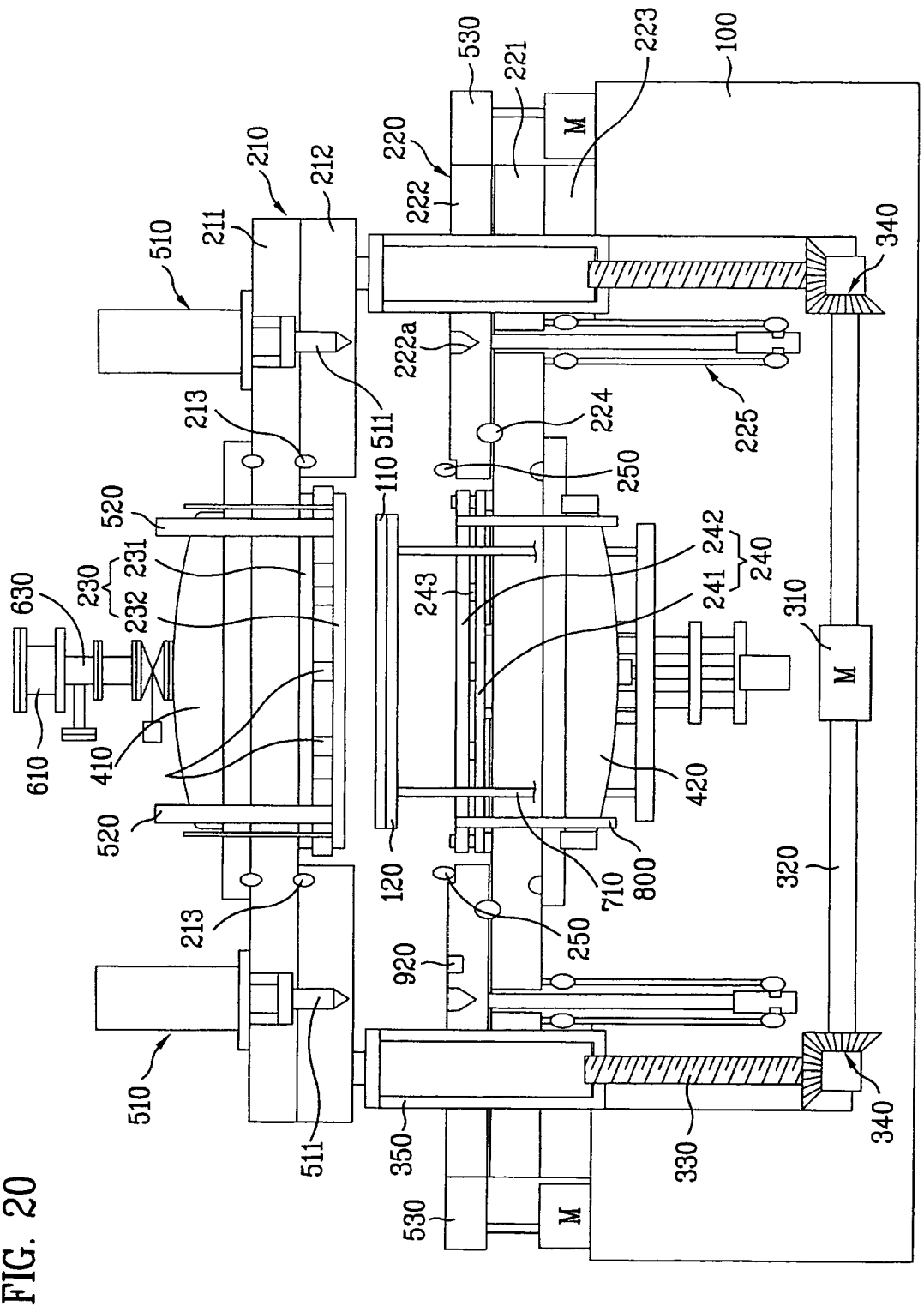

In yet another aspect of the present invention, and with reference to FIG. 19, the bonded substrates 110 and 120 may be removed by deactivating the suction force and electrostatic force applied by the upper stage 230 and raising the upper chamber unit 210 to a predetermined standby height, wherein the bonded substrates are not secured by upper chamber unit 210. Next, referring to FIG. 20, the lift pin 710 may be raised such that bonded substrates 110 and 120 do not contact the lower stage 240, the loader 910 may be inserted into the substrate bonding device proximate the bonded substrates, the lift pin 710 may be lowered such that the bonded substrates are supported by the loader 910, and the loader 910 supporting the bonded substrates may be removed from the substrate bonding device to thereby complete unloading of the bonded substrates 110 and 120.

In the aspect of the present invention described immediately above, the loader 910 may insert an unbonded first substrate 110 into the substrate bonding device prior to unloading the bonded substrates supported by the lower stage 240. The inserted, unbonded first substrate may then be secured by the upper stage 230 via the suction force and electrostatic charge and raised above the predetermined standby height and the loader 910 may then be removed from the substrate bonding device. Next, and as previously described with reference to FIGS. 19 to 21, the lift pin 710 may be raised to free the bonded substrates from the lower stage 240, the loader 910 may be reinserted into the substrate bonding device proximate the bonded substrates supported by the lift pin 719, the lift pin 710 may be lowered such that the bonded substrates are supported by the loader 910, and the loader 910 supporting the bonded substrates may be removed from the substrate bonding device to thereby complete unloading of the bonded substrates 110 and 120.

As has been described, the substrate bonding device facilitating the fabrication of LCD devices formed via a liquid crystal dispensing method and a method for fabricating LCD devices using the same is advantageous because the overall size of the substrate bonding device may be reduced compared to related art substrate bonding devices because the substrate bonding device of the present invention is not provided with functionality to coat sealant material or dispense liquid crystal material onto substrates. Accordingly, the substrate bonding device provides a simplified design and saves space. Moreover, the volume of the interior space defined by the upper and lower chamber units may be minimized to thereby reduce the amount of time required to evacuate the interior space. By reducing the evacuation time, the amount of time required to fabricate an LCD device may be reduced. Further, the upper stage can be leveled with respect to the lower stage using the linear actuators, even if the second substrate secured by the lower stage is tilted. Still further, providing a low vacuum chamber to each of the chamber units prevents a sagging of the chamber units, thereby providing a stable substrate bonding. Lastly, a simplified structure may be obtained by using the plurality of rotatable cams to align the substrates by adjusting a position of the lower chamber unit.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for fabricating a liquid crystal display (LCD) panel using a substrate bonding device having a base frame; a lower chamber unit mounted to the base frame, wherein the lower chamber unit includes an upper surface; an upper chamber unit arranged over the lower chamber unit, wherein the upper chamber unit is moveable relative to the base frame and wherein the upper chamber unit includes a lower surface; chamber moving means mounted to the base frame for raising and lowering the upper chamber unit; an upper stage fixed to the upper chamber unit for securing a first substrate; a lower stage fixed to the lower chamber unit for securing a second substrate; and sealing means provided to at least one of the upper and lower surfaces for sealing an interior space surrounding the first and second substrates, wherein the sealed interior space is definable joined ones of the upper and lower chamber units, the method comprising:
    loading the first and second substrates onto the upper and lower stages, respectively;
    lowering the upper chamber unit to seal the interior space from an external environment via the sealing means;
    evacuating the sealed interior space;
    moving the upper chamber unit and the upper stage aligning the first and second substrates;
    contacting the first and second substrates with a sealant material;
    venting the sealed interior space to apply pressure to the first and second substrates contacted by the sealant material, wherein, after the venting, the first and second substrates are bonded together; and
    unloading the bonded substrates,
    wherein the moving the upper chamber unit and the upper stage includes:
    spacing the first and second substrates apart by a first predetermined distance;
    aligning at least one set of rough alignment marks; and
    aligning at least one set of fine alignment marks after aligning the rough alignment marks, wherein the distance between the first and second substrates is varied during the aligning of the fine alignment marks.

2. The method as claimed in claim 1, wherein a distance between the first and second substrates is less than the first predetermined distance during the aligning of the fine alignment marks.

3. The method as claimed in claim 1, wherein aligning the rough alignment marks includes determining a state of alignment using two cameras arranged at at least two diagonally opposed regions of the first and second substrates.

4. The method as claimed in claim 1, wherein aligning the fine alignment marks includes determining a state of alignment using cameras arranged at four corner regions of the first and second substrates.

5. The method as claimed in claim 1, wherein varying the distance between the first and second substrates includes:
    arranging the upper stage such that the first and second substrates do not contact each other; and
    lowering the upper stage such that a central portion of the first contacts a central portion of the second substrate, wherein the fine alignment marks are aligned between the arranging and the lowering of the upper stage.

6. The method as claimed in claim 1, wherein aligning the rough alignment marks includes focusing an alignment camera at an intermediate point between the first and second substrates.

7. The method as claimed in claim 1, wherein aligning the fine alignment marks includes focusing an alignment camera at an intermediate point between the first and second substrates.

8. The method as claimed in claim 1, wherein aligning the rough alignment marks includes further comprising alternating a focusing of an alignment camera between rough alignment marks formed on the second substrate and on rough alignment marks formed on the first substrate.

9. The method as claimed in claim 1, wherein aligning the fine alignment marks includes further comprising alternating a focusing of an alignment camera between fine alignment marks formed on the second substrate and on fine alignment marks formed on the first substrate.

10. A method for fabricating a liquid crystal display (LCD) panel using a substrate bonding device having a base frame; a lower chamber unit mounted to the base frame, wherein the lower chamber unit includes an upper surface; an upper chamber unit arranged over the lower chamber unit, wherein the upper chamber unit is moveable relative to the base frame and wherein the upper chamber unit includes a lower surface; chamber moving means mounted to the base frame for raising and lowering the upper chamber unit; an upper stage fixed to the upper chamber unit for securing a first substrate; a lower stage fixed to the lower chamber unit for securing a second substrate; and sealing means provided to at least one of the upper and lower surfaces for sealing an interior space surrounding the first and second substrates, wherein the sealed interior space is definable joined ones of the upper and lower chamber units, the method comprising:
    loading the first and second substrates onto the upper and lower stages, respectively;
    lowering the upper chamber unit to seal the interior space from an external environment via the sealing means;
    evacuating the sealed interior space;
    moving the upper chamber unit and the upper stage aligning the first and second substrates;
    contacting the first and second substrates with a sealant material;
    venting the sealed interior space to apply pressure to the first and second substrates contacted by the sealant material, wherein, after the venting, the first and second substrates are bonded together;
    unloading the bonded substrates,
    wherein loading the first substrate to the upper stage includes applying a suction force and an electrostatic charge from the upper stage to the first substrate and, after aligning the first and second substrates, the method further comprising:
    deactivating the electrostatic charge applied from the upper stage;
    raising the upper chamber unit to a predetermined height;
    determining an alignment state of the first and second substrates; and
    realigning the aligned first and second substrates based upon the determination of the alignment state.

11. The method as claimed in claim 10, wherein the determining the alignment state includes using at least one set of fine alignment marks.

12. A method for fabricating a liquid crystal display (LCD) panel using a substrate bonding device having a base frame; a lower chamber unit mounted to the base frame, wherein the lower chamber unit includes an upper surface; an upper chamber unit arranged over the lower chamber unit, wherein the upper chamber unit is moveable relative to the base frame and wherein the upper chamber unit includes a lower surface; chamber moving means mounted to the base frame for raising and lowering the upper chamber unit; an upper stage fixed to the upper chamber unit for securing a first substrate; a lower stage fixed to the lower chamber unit for securing a second substrate; and sealing means provided to at least one of the upper and lower surfaces for sealing an interior space surrounding the first and second substrates, wherein the sealed interior space is definable joined ones of the upper and lower chamber units, the method comprising:

loading the first and second substrates onto the upper and lower stages, respectively;
lowering the upper chamber unit to seal the interior space from an external environment via the sealing means;
evacuating the sealed interior space;
moving the upper chamber unit and the upper stage aligning the first and second substrates;
contacting the first and second substrates with a sealant material;
venting the sealed interior space to apply pressure to the first and second substrates contacted by the sealant material, wherein, after the venting, the first and second substrates are bonded together;
unloading the bonded substrates;
providing a plurality of venting holes within the upper and lower stages; and
providing low vacuum chamber pipelines to the sealed interior space, wherein the venting includes:
in a first venting step, injecting nitrogen gas into the sealed interior space through the plurality of venting holes provided within the upper and lower stages; and
in a second step, injecting nitrogen gas through the low vacuum chamber pipelines increase the pressure inside the sealed interior space equal to an atmospheric pressure.

13. A method for fabricating a liquid crystal display (LCD) panel using a substrate bonding device having a base frame; a lower chamber unit mounted to the base frame, wherein the lower chamber unit includes an upper surface; an upper chamber unit arranged over the lower chamber unit, wherein the upper chamber unit is moveable relative to the base frame and wherein the upper chamber unit includes a lower surface; chamber moving means mounted to the base frame for raising and lowering the upper chamber unit; an upper stage fixed to the upper chamber unit for securing a first substrate; a lower stage fixed to the lower chamber unit for securing a second substrate; and sealing means provided to at least one of the upper and lower surfaces for sealing an interior space surrounding the first and second substrates, wherein the sealed interior space is definable joined ones of the upper and lower chamber units, the method comprising:

loading the first and second substrates onto the upper and lower stages, respectively;
lowering the upper chamber unit to seal the interior space from an external environment via the sealing means;
evacuating the sealed interior space;
moving the upper chamber unit and the upper stage, aligning the first and second substrates;
contacting the first and second substrates with a sealant material;
venting the sealed interior space to apply pressure to the first and second substrates contacted by the sealant material, wherein, after the venting, the first and substrates are bonded together; and
unloading the bonded substrates,
wherein the unloading includes:
securing the bonded substrates to the upper stage;
raising the upper stage to which the bonded substrates are secured;
arranging a loader proximate the bonded substrates, secured to the upper stage;
releasing the bonded substrates from the upper stage, wherein the released bonded substrates are supported by the loader; and
removing the loader supporting the bonded substrates from the substrate bonding machine.

14. A method for fabricating a liquid crystal display (LCD) panel using a substrate bonding device having a base frame; a lower chamber unit mounted to the base frame, wherein the lower chamber unit includes an upper surface; an upper chamber unit arranged over the lower chamber unit, wherein the upper chamber unit is moveable relative to the base frame and wherein the upper chamber unit includes a lower surface; chamber moving means mounted to the base frame for raising and lowering the upper chamber unit; an upper stage fixed to the upper chamber unit for securing a first substrate; a lower stage fixed to the lower chamber unit for securing a second substrate; and sealing means provided to at least one of the upper and lower surfaces for sealing an interior space surrounding the first and second substrates, wherein the sealed interior space is definable joined ones of the upper and lower chamber units, the method comprising:

loading the first and second substrates onto the upper and lower stages, respectively;
lowering the upper chamber unit to seal the interior space from an external environment via the sealing means;
evacuating the sealed interior space;
moving the upper chamber unit and the upper stage aligning the first and second substrates;
contacting the first and second substrates with a sealant material;
venting the sealed interior space to apply pressure to the first and second substrates contacted by the sealant material, wherein, after the venting, the first and second substrates are bonded together;
unloading the bonded substrates,
wherein the unloading includes:
securing the bonded substrates to the upper stage;
raising the upper stage to which the bonded substrates are secured;
raising a lift pin through the lower stage and over the upper surface, wherein the raised lift pin is proximate the secured bonded substrates;
releasing the bonded substrates from the upper stage, wherein the released bonded substrates are supported by the raised lift pin; and
arranging a loader proximate the bonded substrates supported by the raised lift pin;
lowering the raised lift pin such that the bonded substrates are supported by the loader; and
removing the loader supporting the bonded substrates from the substrate bonding machine.

15. A method for fabricating a liquid crystal display (LCD) panel using a substrate bonding device having a base frame; a lower chamber unit mounted to the base frame, wherein the lower chamber unit includes an upper surface; an upper chamber unit arranged over the lower chamber unit, wherein the upper chamber unit is moveable relative to the base frame and wherein the upper chamber unit includes a lower surface; chamber moving means mounted to the base frame for raising and lowering the upper chamber unit; an upper stage fixed to the upper chamber unit for securing a first substrate; a lower stage fixed to the lower chamber unit for securing a second substrate; and sealing means provided to at least one of the upper and lower surfaces for sealing an interior space surrounding the first and second substrates, wherein the sealed interior space is definable joined ones of the upper and lower chamber units, the method comprising:

loading the first and second substrates onto the upper and lower stages, respectively;

lowering the upper chamber unit to seal the interior space from an external environment via the sealing means;

evacuating the sealed interior space;

moving the upper chamber unit and the upper stage aligning the first and second substrates;

contacting the first and second substrates with a sealant material;

venting the sealed interior space to apply pressure to the first and second substrates contacted by the sealant material, wherein, after the venting, the first and second substrates are bonded together;

unloading the bonded substrates, wherein the unloading includes:

raising the bonded substrates above the upper surface, wherein the raised bonded substrates are supported by a raised lift pin arranged through the lower stage and over the upper surface;

arranging a loader proximate the raised bonded substrates supported by the lift pin;

lowering the raised lift pin such that the bonded substrates are supported by the loader; and removing the loader supporting the bonded substrates from the substrate bonding machine.

16. The method as claimed in claim 15, further comprising loading an unbonded substrate onto the upper stage prior to removing the loader supporting the bonded substrates from the substrate bonding machine.

* * * * *